US010037104B2

(12) United States Patent
Miyahara et al.

(10) Patent No.: US 10,037,104 B2
(45) Date of Patent: Jul. 31, 2018

(54) TOUCH PANEL DEVICE WITH ABNORMAL STATE DETECTION

(71) Applicant: Mitsubishi Electric Corporation, Tokyo (JP)

(72) Inventors: Kageyasu Miyahara, Tokyo (JP); Seiichiro Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/493,738

(22) Filed: Apr. 21, 2017

(65) Prior Publication Data

US 2017/0228099 A1 Aug. 10, 2017

Related U.S. Application Data

(62) Division of application No. 14/067,545, filed on Oct. 30, 2013.

(30) Foreign Application Priority Data

Nov. 29, 2012 (JP) .................................. 2012-260479

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC .............................. G06F 3/044; G06F 3/0418
See application file for complete search history.

(56) References Cited

U.S. PATENT DOCUMENTS

| 8,493,356 | B2 | 7/2013 | Joharapurkar et al. |
| 8,773,146 | B1 | 7/2014 | Hills et al. |
| 8,982,097 | B1 | 3/2015 | Kuzo et al. |
| 9,442,610 | B2 | 9/2016 | Joharapurkar et al. |
| 2003/0210235 | A1 | 11/2003 | Roberts |
| 2005/0122785 | A1 | 6/2005 | Umeda et al. |
| 2008/0136792 | A1 | 6/2008 | Peng et al. |
| 2008/0158182 | A1 | 7/2008 | Westerman |
| 2008/0196945 | A1 | 8/2008 | Konstas |
| 2010/0085322 | A1 | 4/2010 | Mamba et al. |

(Continued)

FOREIGN PATENT DOCUMENTS

DE 10 2011 017 231 A1 2/2012
JP 2010-092152 A 4/2010

(Continued)

OTHER PUBLICATIONS

An Office Action issued by the German Patent Office dated Feb. 8, 2017, which corresponds to German Patent Application No. 10 2013 224 619.6 and is related to U.S. Appl. No. 14/067,545; with English language translation.

*Primary Examiner* — William Boddie
*Assistant Examiner* — Andrew Schnirel
(74) *Attorney, Agent, or Firm* — Studebaker & Brackett PC

(57) ABSTRACT

A touch panel device includes an abnormal state determining part that determines if there is an abnormal state based on second difference information extracted by a second difference information extracting part and a second baseline stored in a second baseline storage, and a controller that, if the abnormal state determining part determines that there is an abnormal state, controls to update a first baseline stored in a first baseline storage and the second baseline stored in the second baseline storage.

8 Claims, 18 Drawing Sheets

(56) References Cited

U.S. PATENT DOCUMENTS

| | | |
|---|---|---|
| 2010/0258361 A1 | 10/2010 | Yamauchi et al. |
| 2010/0307840 A1 | 12/2010 | Kobayashi et al. |
| 2011/0216016 A1 | 9/2011 | Rosener |
| 2011/0261007 A1 | 10/2011 | Joharapurkar et al. |
| 2011/0291939 A1 | 12/2011 | Tsukahara et al. |
| 2012/0075220 A1 | 3/2012 | Matsui et al. |
| 2013/0176268 A1 | 7/2013 | Li et al. |
| 2013/0181930 A1 | 7/2013 | Imada et al. |
| 2016/0209947 A1 | 7/2016 | Joharapurkar et al. |
| 2016/0313863 A1 | 10/2016 | Joharapurkar et al. |

FOREIGN PATENT DOCUMENTS

| | | |
|---|---|---|
| JP | 2010-282539 A | 12/2010 |
| JP | 2011-180401 A | 9/2011 |
| JP | 2011-248793 A | 12/2011 |
| JP | 2012-069083 A | 4/2012 |
| JP | 2012-073662 A | 4/2012 |
| JP | 2012-150747 A | 8/2012 |
| JP | 2012-195019 A | 10/2012 |
| WO | 2009/090820 A1 | 7/2009 |

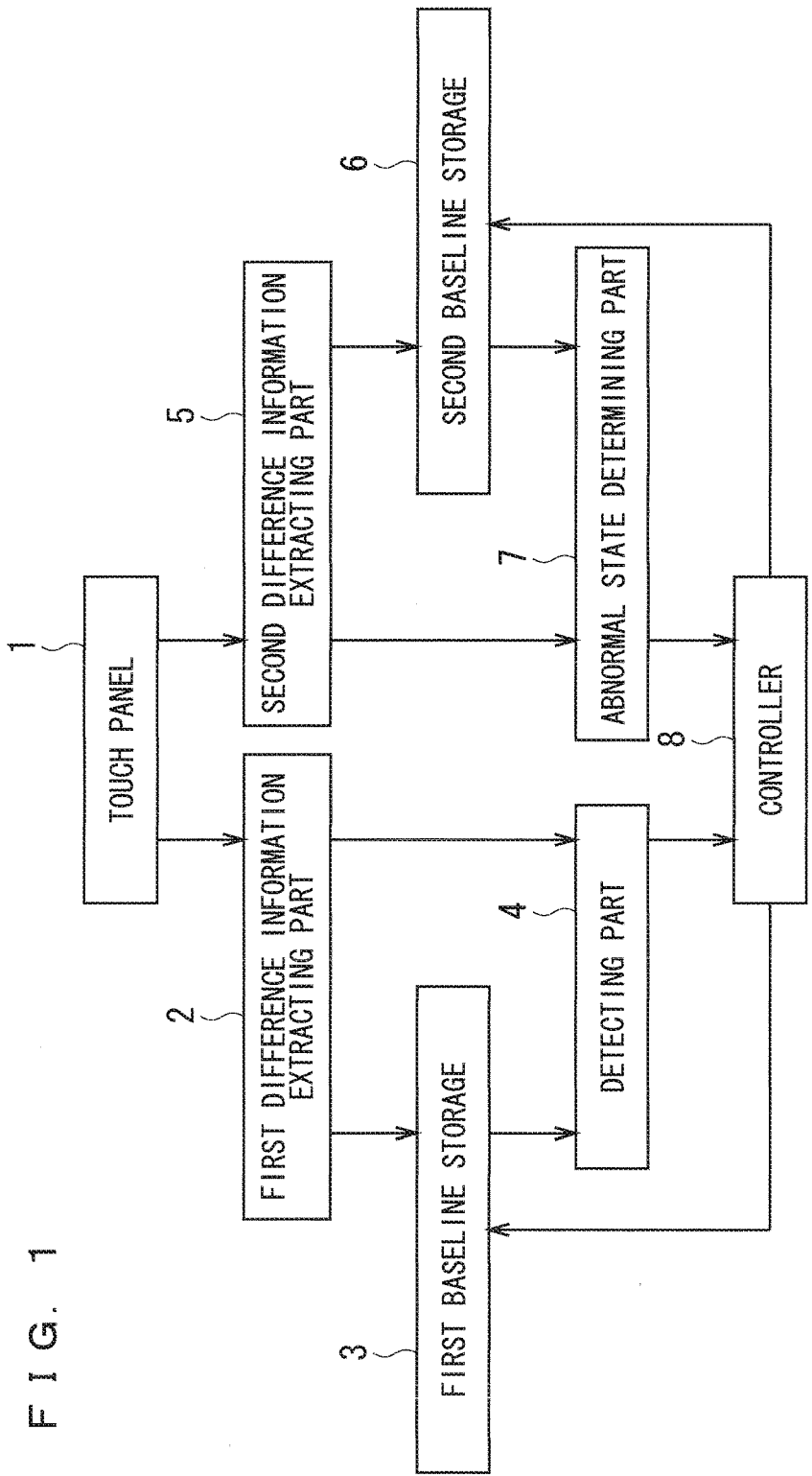

F I G. 1 3
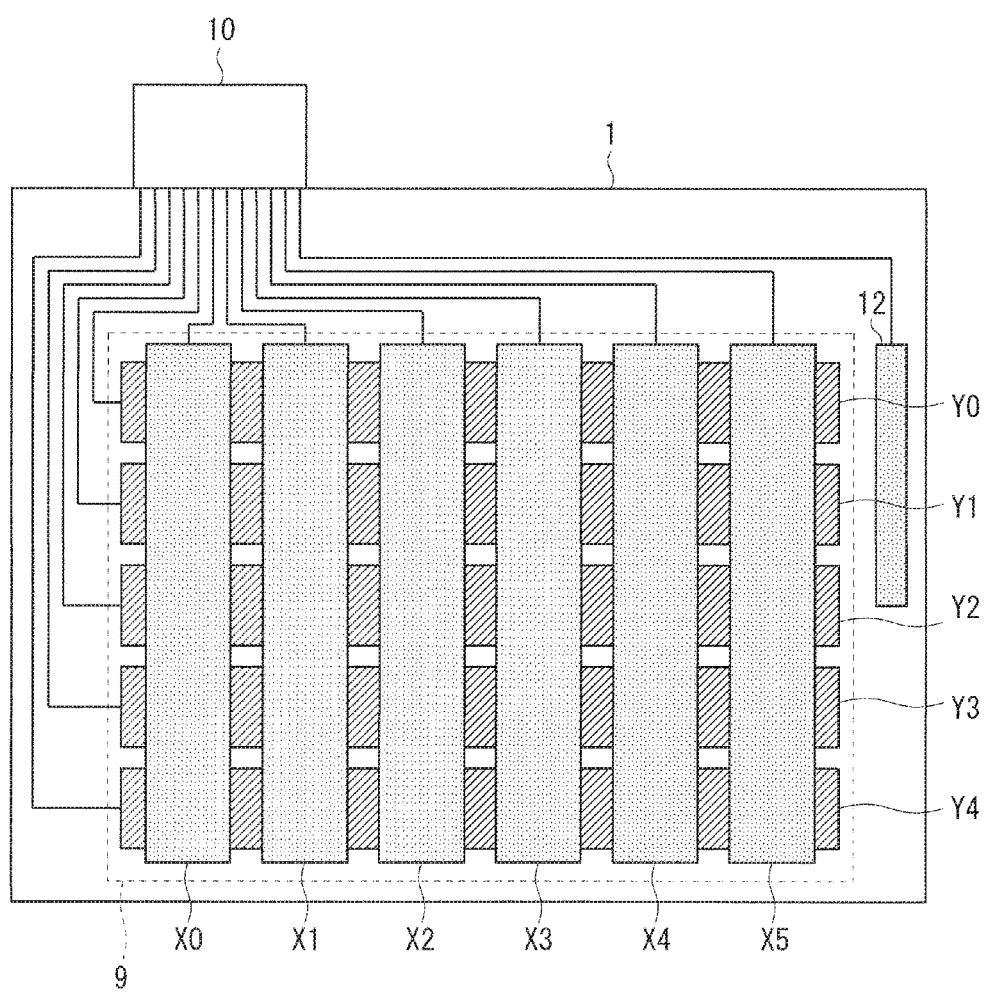

F I G. 2 1
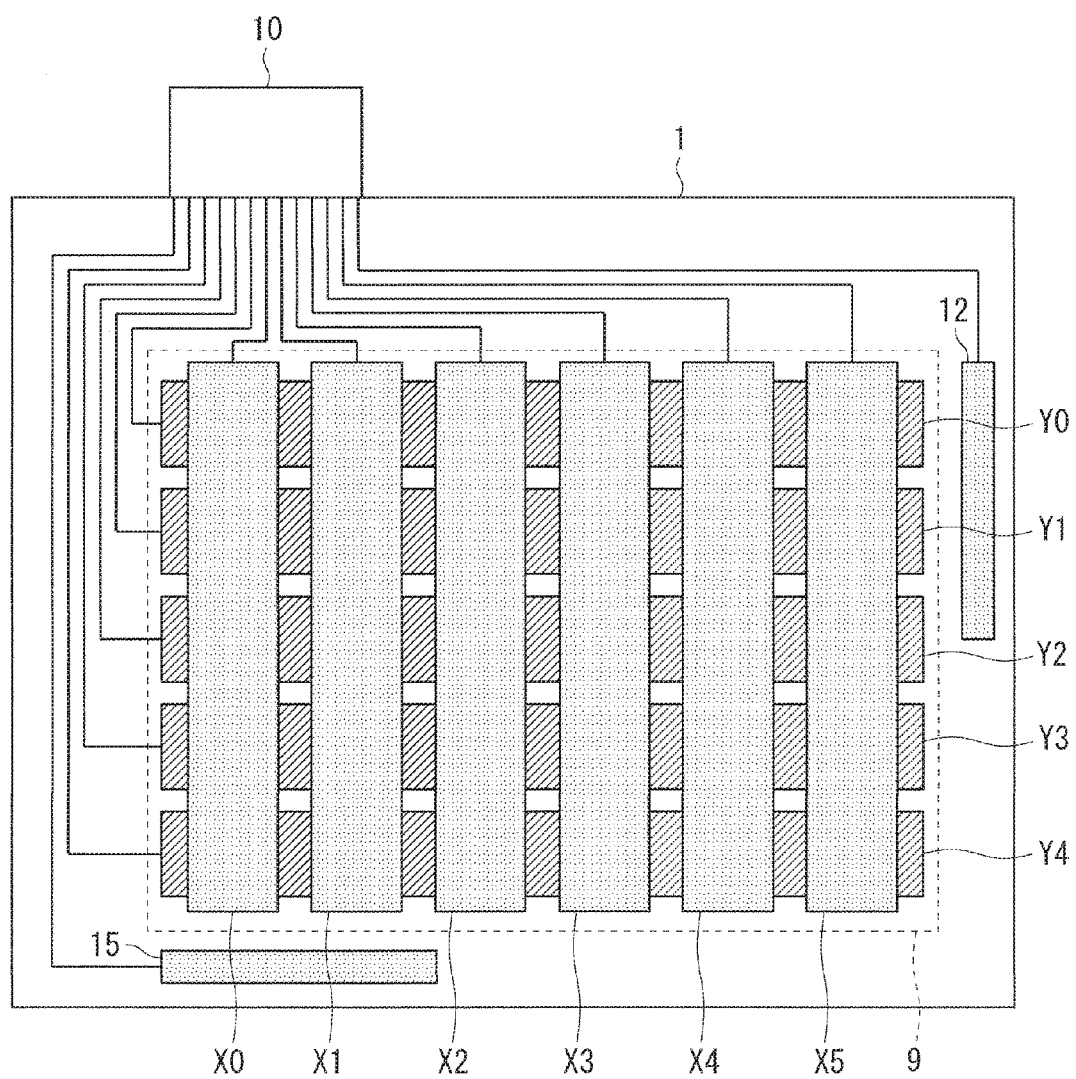

TOUCH PANEL DEVICE WITH ABNORMAL STATE DETECTION

CROSS-REFERENCE TO RELATED APPLICATIONS

The present application is a Divisional Application of U.S. patent application Ser. No. 14/067,545 filed Oct. 30, 2013, which claims priority from Japanese Patent Application No. 2012-260479 filed Nov. 29, 2012, the contents of which are all herein incorporated by reference in their entirety.

FIELD OF THE INVENTION

The present invention relates to a touch panel device and more specifically, to a capacitive touch panel device.

BACKGROUND ART

In a capacitive touch panel device, a value (capacitance value) measured when a detection target such as a finger does not contact (touch) a touch panel is stored in advance as a baseline. In detecting the target, a difference between a value measured at the time of the detection and the baseline is used. This difference becomes close to zero if the detection target does not contact the touch panel, and becomes a large positive value if the detection target contacts the touch panel. Thus, a touch on the touch panel by the detection target can be detected based on the difference between the measured value and the baseline. However, a value measured when the detection target touches the touch panel might be employed as the baseline. In this case, the generated baseline is not an appropriate baseline, so that a touch cannot be detected correctly. In response, an abnormal state caused by the inappropriate baseline should be detected and the baseline should be corrected.

According to an example of a responsive method, if a state where the aforementioned difference does not exceed a threshold (negative value) for determination about abnormality lasts for a certain period of time or more, it is determined that the baseline is in an abnormal state. If the baseline is determined to be in an abnormal state, the baseline is updated to be in a normal state (see Japanese Patent Application Laid-Open No. 2012-150747, for example). According to the method of Japanese Patent Application Laid-Open No. 2012-150747, if an object contacts a touch panel at the time of generation of a baseline and the object disappears (comes off the touch panel) thereafter, for example, this state is regarded as an abnormal state. In this case, a capacitance determined when the object disappears becomes lower than that determined when the baseline is generated, so that the aforementioned difference becomes a negative value to be used for detection.

A differential detection system is known as a system to enhance noise tolerance of a touch panel device (see Japanese Patent Application Laid-Open Nos. 2010-282539 and 2012-69083, for example). This detection system measures a difference in capacitance between a plurality of sensors arranged on a touch panel, and makes use of differences in capacitance between adjacent sensors for detection of multiple points (a plurality of touched positions).

A touch panel device employing a differential capacitance detection system having high noise tolerance such as that disclosed in Japanese Patent Application Laid-Open No. 2010-282539 or 2012-69083 cannot make the determination about an abnormal state and the baseline correction of Japanese Patent Application Laid-Open No. 2012-150747. This is due to the fact that the differential capacitance detection system cannot measure an absolute capacitance value so cannot recognize a capacitance reduction of a sensor. As an example, in response to change of a measured value corresponding to a difference in capacitance between sensors, this system finds difficulty in determining if the capacitance value of one of the sensors targeted for the measurement has increased or that of the other sensor has decreased. This determination becomes more difficult, particularly if adjacent sensors arranged in proximity are used in combination for measurement of a difference in capacitance therebetween, for example, as a finger having touched one of the sensors affects the other sensor.

SUMMARY OF THE INVENTION

It is an object of the present invention to provide a touch panel device capable of making determination about an abnormal state and correcting a baseline appropriately even in the use of a differential capacitance detection system.

A touch panel device includes: a touch panel having a plurality of sensors that measure a capacitance; a first difference information extracting part that extracts, as first difference information, a difference in capacitance between adjacent ones of the plurality of sensors; a first baseline storage that stores, as a first base line, the first difference information extracted by the first difference information extracting part when a detection target is not in proximity to or does not contact the touch panel; a detecting part that detects proximity to or contact with the touch panel by the detection target based on the first difference information extracted by the first difference information extracting part and the first baseline stored in the first baseline storage; a second difference information extracting part that extracts, as second difference information, a difference in capacitance between a reference sensor being a predetermined sensor among the plurality of sensors and a sensor among the plurality of sensors and different from the reference sensor; a second baseline storage that stores, as a second baseline, the second difference information extracted by the second difference information extracting part when the detection target is not in proximity to or does not contact the touch panel; an abnormal state determining part that determines if there is an abnormal state based on the second difference information extracted by the second difference information extracting part and the second baseline stored in the second baseline storage; and a controller that, if the abnormal state determining part determines that there is an abnormal state, controls to update the first and second baselines stored in the first and second baseline storages respectively.

The touch panel device of the present invention includes: a touch panel having a plurality of sensors that measure a capacitance; a first difference information extracting part that extracts, as first difference information, a difference in capacitance between adjacent ones of the plurality of sensors; a first baseline storage that stores, as a first base line, the first difference information extracted by the first difference information extracting part when a detection target is not in proximity to or does not contact the touch panel; a detecting part that detects proximity to or contact with the touch panel by the detection target based on the first difference information extracted by the first difference information extracting part and the first baseline stored in the first baseline storage; a second difference information extracting part that extracts, as second difference information, a difference in capacitance between a reference sensor being a predetermined sensor among the plurality of sensors and a sensor among the plurality of sensors and different from the reference sensor; a second baseline storage that stores, as a second baseline, the second difference information extracted by the second difference information extracting part when the detection target is not in proximity to or does not contact the touch panel; an abnormal state determining part that determines if there is an abnormal state based on the second difference information extracted by the second difference information extracting part and the second baseline stored in the second baseline storage; and a controller that, if the abnormal state determining part determines that there is an abnormal state, controls to update the first and second baselines stored in the first and second baseline storages respectively. Thus, even in the use of a differential capacitance detection system, determination about an abnormal state can be made and a baseline can be corrected appropriately.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing an example of the structure of a touch panel device according to a first preferred embodiment of the present invention;

FIG. 13 shows the structure of a touch panel according to the second preferred embodiment of the present invention;

FIG. 21 shows the structure of a touch panel according to a third preferred embodiment of the present invention;

EMBODIMENT FOR CARRYING OUT THE INVENTION

Figure 2:
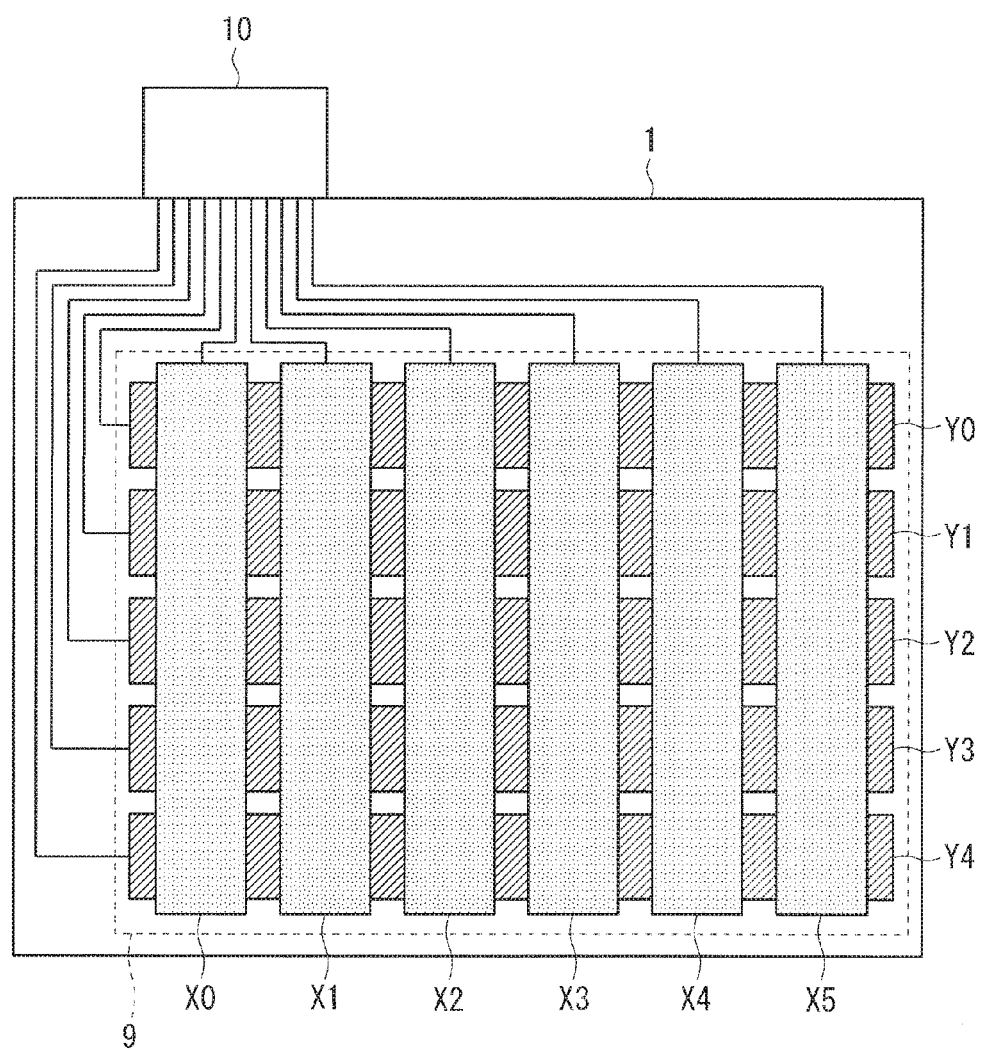
FIG. 2 shows the structure of a touch panel according to the first preferred embodiment of the present invention.

Preferred embodiments of the present invention are described below by referring to the drawings.

<First Preferred Embodiment>

The structure of a touch panel device according to a first preferred embodiment of the present invention is described first.

FIG. 1 is a block diagram showing an example of the structure of the touch panel device according to the first preferred embodiment.

As shown in FIG. 1, the touch panel device includes a touch panel 1, a first difference information extracting part 2, a first baseline storage 3, a detecting part 4, a second difference information extracting part 5, a second baseline storage 6, an abnormal state determining part 7, and a controller 8.

The touch panel 1 includes a plurality of sensors (sensors X and sensors Y shown in FIG. 2 referred to below) for measurement of a capacitance.

The first difference information extracting part 2 extracts, as first difference information, a difference in capacitance between adjacent ones of the plurality of sensors of the touch panel 1.

The first baseline storage 3 stores, as a first baseline, the first difference information extracted by the first difference information extracting part 2 when a detection target is not in proximity to or does not contact the touch panel 1. In the first preferred embodiment, a user's finger is assumed as the detection target. Proximity or contact by the detection target means that a user's finger is in proximity to or contacts the touch panel 1. In the below, proximity and contact may also be called a "touch" collectively.

The detecting part 4 detects proximity to or contact with the touch panel 1 by the detection target based on the first difference information extracted by the first difference information extracting part 2 and the first baseline stored in the first baseline storage 3.

The second difference information extracting part 5 extracts, as second difference information, a difference in capacitance between a reference sensor being a predetermined sensor among the plurality of plurality of sensors of the touch panel 1 and a sensor among the plurality of sensors and different from the reference sensor. The second baseline storage 6 stores, as a second baseline, the second difference information extracted by the second difference information extracting part 5 when the detection target is not in proximity to or does not contact the touch panel 1.

The abnormal state determining part 7 determines if the second baseline is in an abnormal state based on the second difference information extracted by the second difference information extracting part 5 and the second baseline stored in the second baseline storage 6.

If the abnormal state determining part 7 determines that the second baseline is in an abnormal state, the controller 8 controls to update the first and second baselines stored in the first and second baseline storages 3 and 6 respectively.

FIG. 2 shows the structure of the touch panel 1. The touch panel 1 of FIG. 2 is a projected capacitive touch panel.

As shown in FIG. 2, the touch panel 1 includes sensors X0 to X5 (in the below, also called sensors X collectively) arranged in a horizontal direction to acquire positional information in the horizontal direction, sensors Y0 to Y4 (in the below, also called sensors Y collectively) arranged in a vertical direction to acquire positional information in the vertical direction, and a cable 10 through which each of the sensors X and each of the sensors Y transfer and receive a signal to and from the outside.

A region where each of the sensors X and each of the sensors Y are arranged is called a detection region 9. A touch input is not accepted in a region outside the detection region 9. In this outside region, interconnects for connecting each of the sensors X and each of the sensors Y to the cable 10 are routed.

The operation of the touch panel is explained next by referring to FIGS. 3 to 11.

Figure 3:
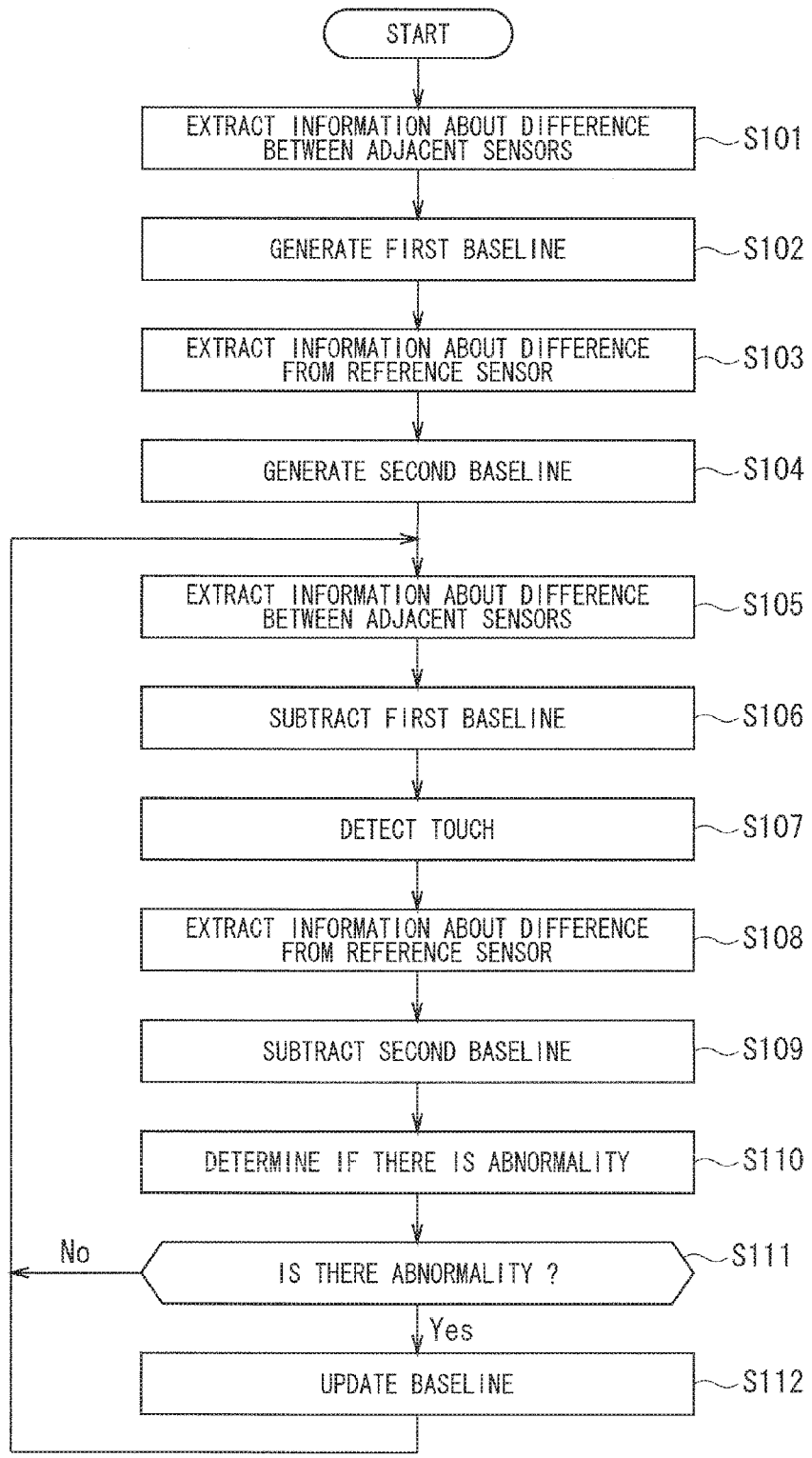
FIG. 3 is a flowchart explaining an example of the operation of the touch panel device according to the first preferred embodiment of the present invention.

FIG. 3 is a flowchart explaining an example of the operation of the touch panel device. In FIG. 3, steps S101 to S104 correspond to initialization operation performed for example immediately after power-on of the touch panel device, and step S105 and its subsequent steps correspond to steady operation.

In step S101, the first difference information extracting part 2 measures respective differences in capacitance between adjacent ones of the sensors X and respective differences in capacitance between adjacent ones of the sensors Y, and extracts the measured differences as pieces of the first difference information.

Figure 4:
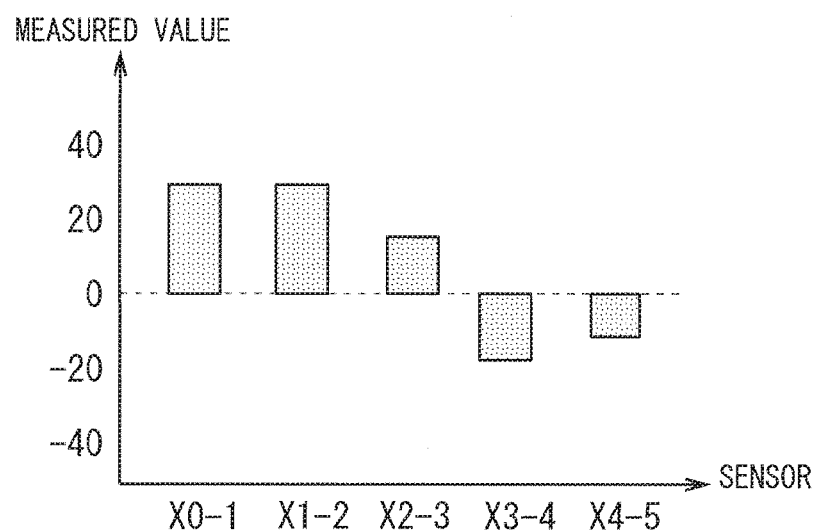
FIG. 4 shows exemplary values measured by a first difference information extracting part in the absence of a touch in the first preferred embodiment of the present invention.

FIG. 4 shows exemplary differences in capacitance (measured values) between adjacent sensors obtained by the first difference information extracting part 2 in the absence of an object contacting the touch panel 1 (in the absence of a touch) by using the sensors X of the touch panel 1 shown in FIG. 2. As shown in FIG. 4, a measured value Xm-n indicates a difference in capacitance between a sensor Xm and a sensor Xn. (As an example, a measured value X0-1 of FIG. 4 indicates a difference in capacitance between the sensors X0 and X1, and corresponds to a result obtained by subtracting the capacitance value of the sensor X1 from that of the sensor X0.) In the absence of an object contacting the touch panel 1, this difference is always zero ideally. However, even in the absence of this object, some difference in capacitance actually exists between adjacent sensors as a result of deviation of a capacitance distribution responsive to the position of a sensor and that of a peripheral object relative to each other. While FIG. 4 only shows the results about the sensors X, the first difference information extracting part 2 extracts the first difference information about the sensors Y in the same manner.

In step S102, the first baseline storage 3 stores, as the first baselines, the pieces of the first difference information input from the first difference information extracting part 2. As an example, the first baseline storage 3 can store, as the first baselines, pieces of the first difference information as they are input from the first difference information extracting part 2. The first baseline storage 3 can also store, as the first baselines, the respective mean values of pieces of the first difference information input a certain number of times from the first difference information extracting part 2.

In step S103, the second difference information extracting part 5 measures respective differences in capacitance between a predetermined reference sensor and different sensors among the sensors X and respective differences in capacitance between a predetermined reference sensor and different sensors among the sensors Y, and extracts the measured differences as pieces of the second difference information. In the first preferred embodiment, the sensor X5 is used as the reference sensor.

Figure 5:
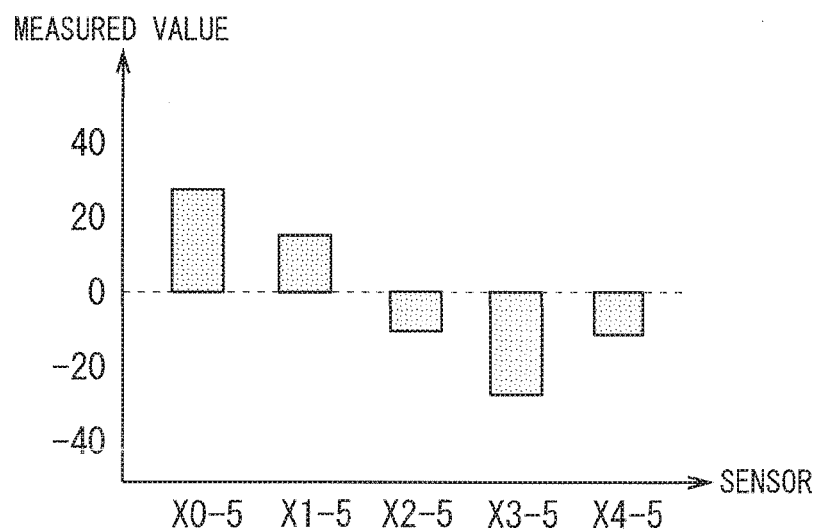
FIG. 5 shows exemplary values measured by a second difference information extracting part in the absence of a touch in the first preferred embodiment of the present invention.

FIG. 5 shows exemplary differences in capacitance (measured values) between a reference sensor and different sensors obtained by the second difference information extracting part 5 in the absence of an object contacting the touch panel 1 by using the sensors X of the touch panel 1 shown in FIG. 2.

As shown in FIG. 5, a measured value Xm-n indicates a difference in capacitance between the sensors Xm and Xn. (As an example, a measured value X0-5 of FIG. 5 indicates a difference in capacitance between the sensors X0 and X5, and corresponds to a result obtained by subtracting the capacitance value of the sensor X5 from that of the sensor X0.) Under ideal conditions, the second difference information can be calculated by integrating pieces of the first difference information extracted by the first difference information extracting part 2. (As an example, the following formula can be established: (X2–5)=(X2–3)+(X3–4)+(X4–5).) However, actually obtaining the second difference information by making such calculation unfavorably increases an error as a result of the integration, so that the second difference information is obtained by actual measurement. While FIG. 5 only shows the results about the sensors X, the second difference information extracting part 5 extracts the second difference information about the sensors Y in the same manner.

In step S104, the second baseline storage 6 stores, as the second baselines, the pieces of the second difference information input from the second difference information extracting part 5. As an example, the second baseline storage 6 can store, as the second baselines, pieces of the second difference information as they are input from the second difference information extracting part 5. The second baseline storage 6 can also store, as the second baselines, the respective mean values of pieces of the second difference information input a certain number of times from the second difference information extracting part 5.

Like in step S101, the first difference information extracting part 2 measures respective differences in capacitance between adjacent sensors, and extracts the measured differences as pieces of the first difference information in step S105.

In step S106, the detecting part 4 subtracts the first baselines stored in the first baseline storage 3 from the pieces of the first difference information measured and extracted in step S105. Assuming that the measured values of FIG. 4 are the first baselines for the sensors X, the values about the sensors X measured in step S105 are substantially the same as those of FIG. 4 in the absence of an object contacting the touch panel 1. Thus, all the subtraction results obtained in step S106 become substantially zero.

Figure 6:
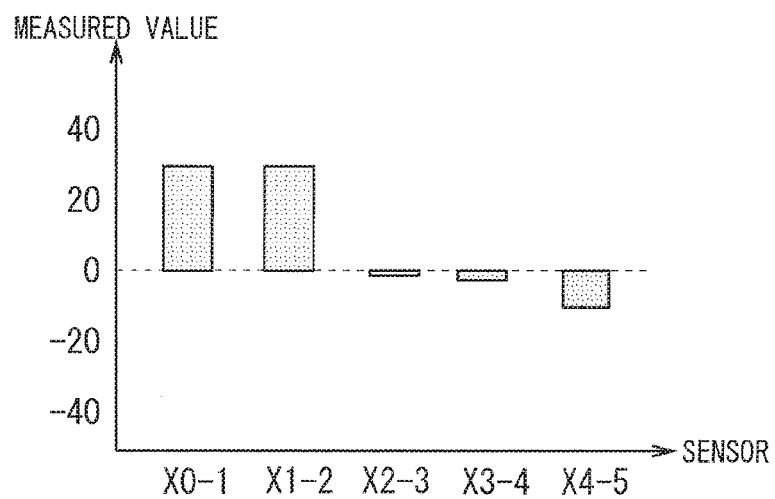
FIG. 6 shows exemplary values measured by the first difference information extracting part in the presence of a touch in the first preferred embodiment of the present invention.
Figure 7:
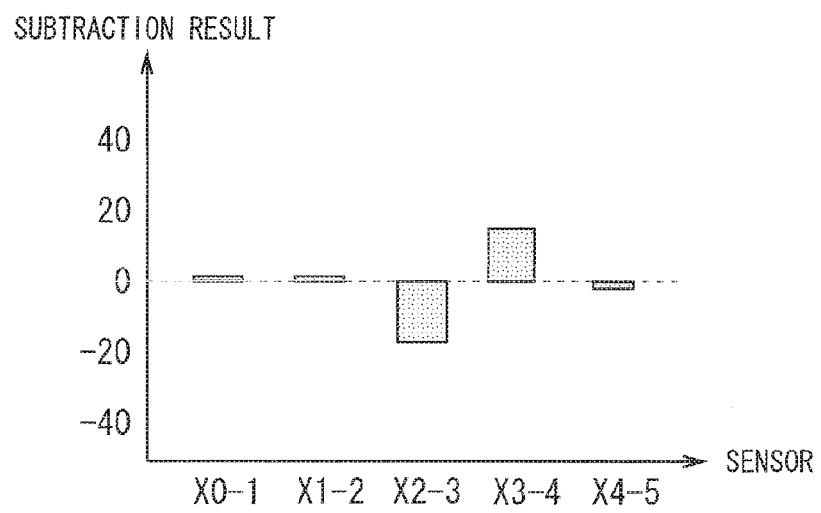
FIG. 7 shows exemplary results obtained by subtracting first baselines from values measured by the first difference information extracting part in the first preferred embodiment of the present invention.

Meanwhile, if values about the sensors X are measured in step S105 with a finger touching the sensor X3 are these values are those shown in FIG. 6, the subtraction results obtained in step S106 are those shown in FIG. 7 obtained by subtracting the values of FIG. 4 from the values of FIG. 6. FIG. 7 shows differences between adjacent sensors, and these differences are pure difference information obtained by removing deviation in capacitance from the measured values about the sensors X. Thus, a positive value and a negative value appear on opposite sides of a touched position.

In step S107, based on the subtraction results obtained in step S106, the detecting part 4 determines the presence or absence of a touch on the touch panel 1 with a finger and detects a touched position in the presence of the touch. The process in step S107 can be performed by a conventional touch detection method responsive to a differential system. As an example, the method of acquiring contact information about each sensor by integrating difference information disclosed in Japanese Patent Application Laid-Open No. 2012-69083 is applicable.

Like in step S103, the second difference information extracting part 5 measures respective differences in capacitance between a reference sensor and different sensors, and extracts the measured differences as pieces of the second difference information in step S108.

Figure 8:
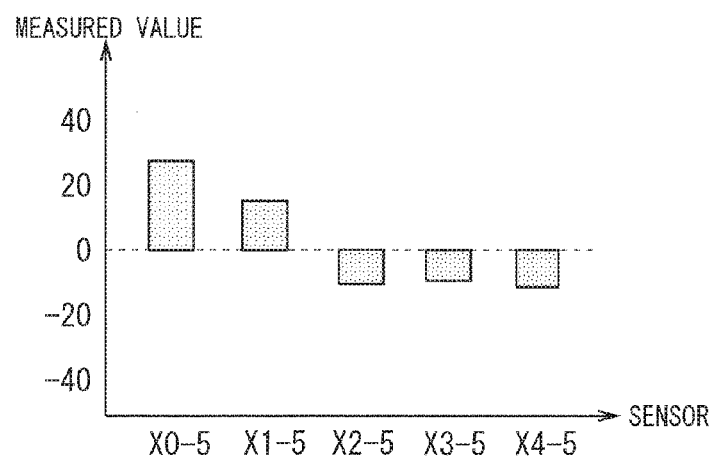
FIG. 8 shows exemplary values measured by the second difference information extracting part in the presence of a touch in the first preferred embodiment of the present invention.
Figure 9:
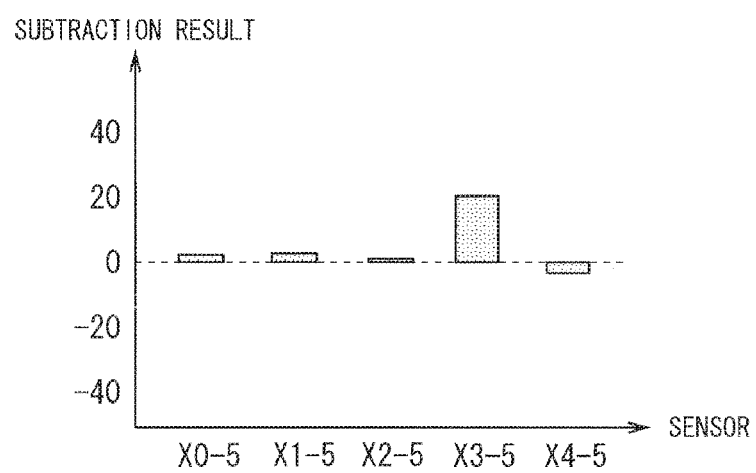
FIG. 9 shows exemplary results obtained by subtracting second baselines from values measured by the second difference information extracting part in the first preferred embodiment of the present invention.

In step S109, the abnormal state determining part 7 subtracts the second baselines stored in the second baseline storage 6 from the pieces of the second difference information measured and extracted in step S108. Assuming that the values of FIG. 5 are the second baselines for the sensors X, for example, the values about the sensors X measured in step S108 are substantially the same as those of FIG. 5 in the absence of an object contacting the touch panel 1. Thus, all the subtraction results obtained in step S109 become substantially zero. Meanwhile, if values about the sensors X measured in step S108 are measured with a finger touching the sensor X3 and these values are those shown in FIG. 8, the subtraction results obtained in step S109 are those shown in FIG. 9 obtained by subtracting the values of FIG. 5 from the values of FIG. 8. Like those of FIG. 7, the values of FIG. 9 are obtained by removing deviation in capacitance so that they can be processed easily. While the processes in steps S105 to S109 are performed on the sensors X, they are also performed on the sensors Y.

In steps S110 and S111, based on the subtraction results obtained in step S109, the abnormal state determining part 7 determines if the second baselines are in an abnormal state. As an example, a condition for an abnormal state (hereinafter also called an abnormality condition) is such that the subtraction results obtained in step S109 include a value falling below a predetermined negative threshold. The abnormal state determining part 7 determines that there is an abnormal state if this condition is satisfied.

More specifically, where the threshold for the abnormality condition is −10, the values about the sensors X shown in FIG. 9 do not include a value falling below a threshold. If values about the sensors Y do not include a value falling below the threshold either, the abnormal state determining part 7 does not determine that there is an abnormal state and proceeds to subsequent data entry process (to be specific, proceeds to step S105). Meanwhile, if the values about the sensors X or the sensors Y include a value falling below the threshold, the abnormal state determining part 7 determines that there is an abnormal state. Then, the controller 8 exerts control to update the first baselines and the second baselines stored in the first and second baseline storages 3 and 6 respectively (to be specific, proceeds to step S112).

In step S112, first baselines and second baselines are generated again (updated). The first baselines and the second baselines can be updated by following the same processes as those in steps S101 to S104. Or, the respective averages of the first baselines and those of the second baselines generated in steps S101 to S104 may be weighted by newly extracted first difference information and newly extracted second difference information respectively, and resultant averages of the first baselines and those of the second baselines can be employed as new first baselines and new second baselines. In step S112, the first baselines and the second baselines can be updated either by the controller 8 or by an updating part (not shown in the drawings) to update the first baselines and the second baselines under control by the controller 8.

A finger may touch the sensor X3 while the processes in steps S101 to S104 are performed. In this case, the differences of FIG. 6 are stored as the first baselines in the first baseline storage 3, and the differences of FIG. 8 are stored as the second baselines in the second baseline storage 6.

Figure 10:
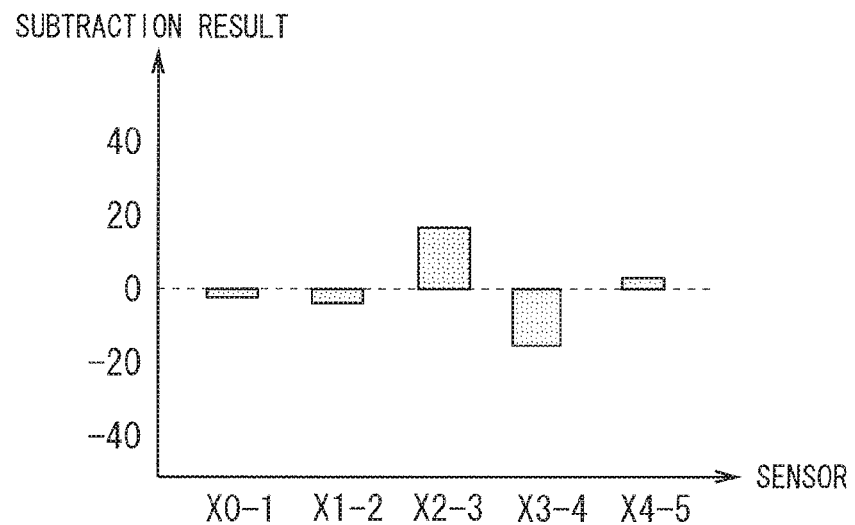
FIG. 10 shows exemplary results obtained by subtracting first baselines from values measured by the first difference information extracting part in the first preferred embodiment of the present invention when the first baselines are values measured in the presence of a touch.
Figure 11:
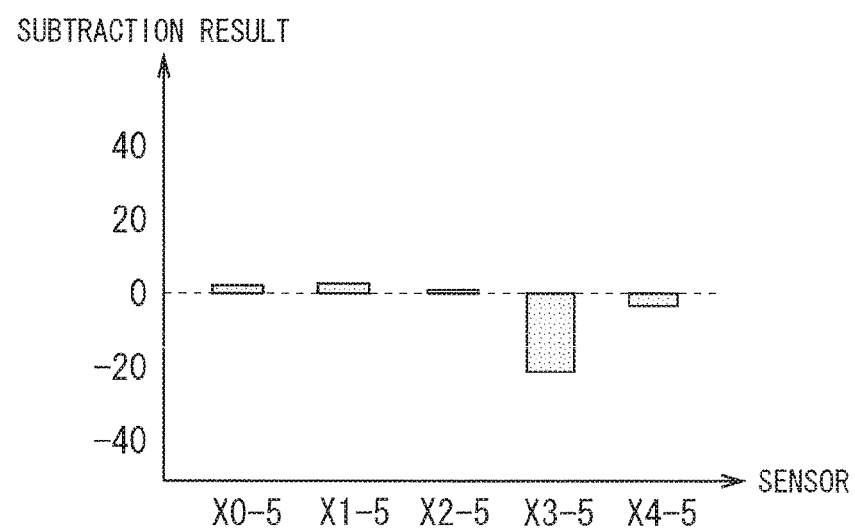
FIG. 11 shows exemplary results obtained by subtracting second baselines from values measured by the second difference information extracting part in the first preferred embodiment of the present invention when the second baselines are values measured in the presence of a touch.

At a time immediately after the finger having touched the sensor X3 comes off the sensor X3 and its subsequent time, the first difference information extracting part 2 extracts, as pieces of the first difference information, the differences of FIG. 4 in step S105. Next, in step S106, the subtraction results of FIG. 10 are obtained by subtracting the values of FIG. 6 (here, first baselines) from the values of FIG. 4 (pieces of the first difference information). Further, in step S108, the second difference information extracting part 5 extracts, as pieces of the second difference information, the differences of FIG. 5. Next, in step S109, the subtraction results of FIG. 11 are obtained by subtracting the values of FIG. 8 (here, second baselines) from the values of FIG. 5 (pieces of the second difference information). Then, it is determined in step S110 that there is an abnormal state, and baselines are updated in step S112.

As described above, if the baselines are in an abnormal state, the subtraction results obtained in step S109 about the second baselines (FIG. 11) include a negative value. Thus, by referring to this negative value, it can be determined correctly if the baselines are in an abnormal state. The subtraction results about the first baselines (FIG. 10) obtained in step S106 under the same condition are similar to values (subtraction results) obtained when there are two touches generated on the opposite sides of the sensor X3, so that they cannot be used in definitely determining that the baselines are in an abnormal state.

As described above, in the first preferred embodiment, difference information about adjacent sensors is used in detecting a touch (proximity to or contact with the touch panel 1 by a detection target), and difference information about a reference sensor determined previously (in advance) and a different sensor is used in making determination about an abnormal state. This allows detection of touches at multiple points even if a differential capacitance detection system having high noise tolerance is used, and realizes a touch panel device that can correct a baseline appropriately by making high-precision determination about an abnormal state.

In the first preferred embodiment, a difference in capacitance between the sensors Xm and Xm+1 (value obtained by subtracting the capacitance value of the sensor Xm+1 from that of the sensor Xm) is described as difference information about adjacent sensors. However, this is not the only example. Difference information about more sensors can be used. As an example, difference information can be a difference between a total of the capacitances of a sensor Xm−2 and a sensor Xm−1 and that of the capacitances of the sensors Xm and Xm+1.

In the first preferred embodiment, the sensor X5 is described as a reference sensor. However, this is not the only example. A different sensor X such as the sensor X0 can be used as the reference sensor, or any of the sensors Y can be used as a reference sensor.

In the first preferred embodiment, one the abnormal state determining part 7 determines that there is an abnormal state in step S111 of FIG. 3, a baseline is updated in step S112. However, this is not the only example. Determination about an abnormal state may be made under a different condition. As an example, a baseline may be updated if the abnormal state determining part 7 successively determines that there is an abnormal state several times. A baseline may also be updated in response not only to determination that there is an abnormal state, but it can always be updated by weighted average, and a weight of the weighted average can be determined based on a result of determination about an abnormal state. In this case, a baseline can be changed (updated) slightly to keep pace with change in environment such as temperature if it is determined that there is no an abnormal state, and can be changed (updated) significantly if it is determined that there is an abnormal state.

<Second Preferred Embodiment>

The structure of a touch panel device according to a second preferred embodiment of the present invention is described first.

Figure 12:
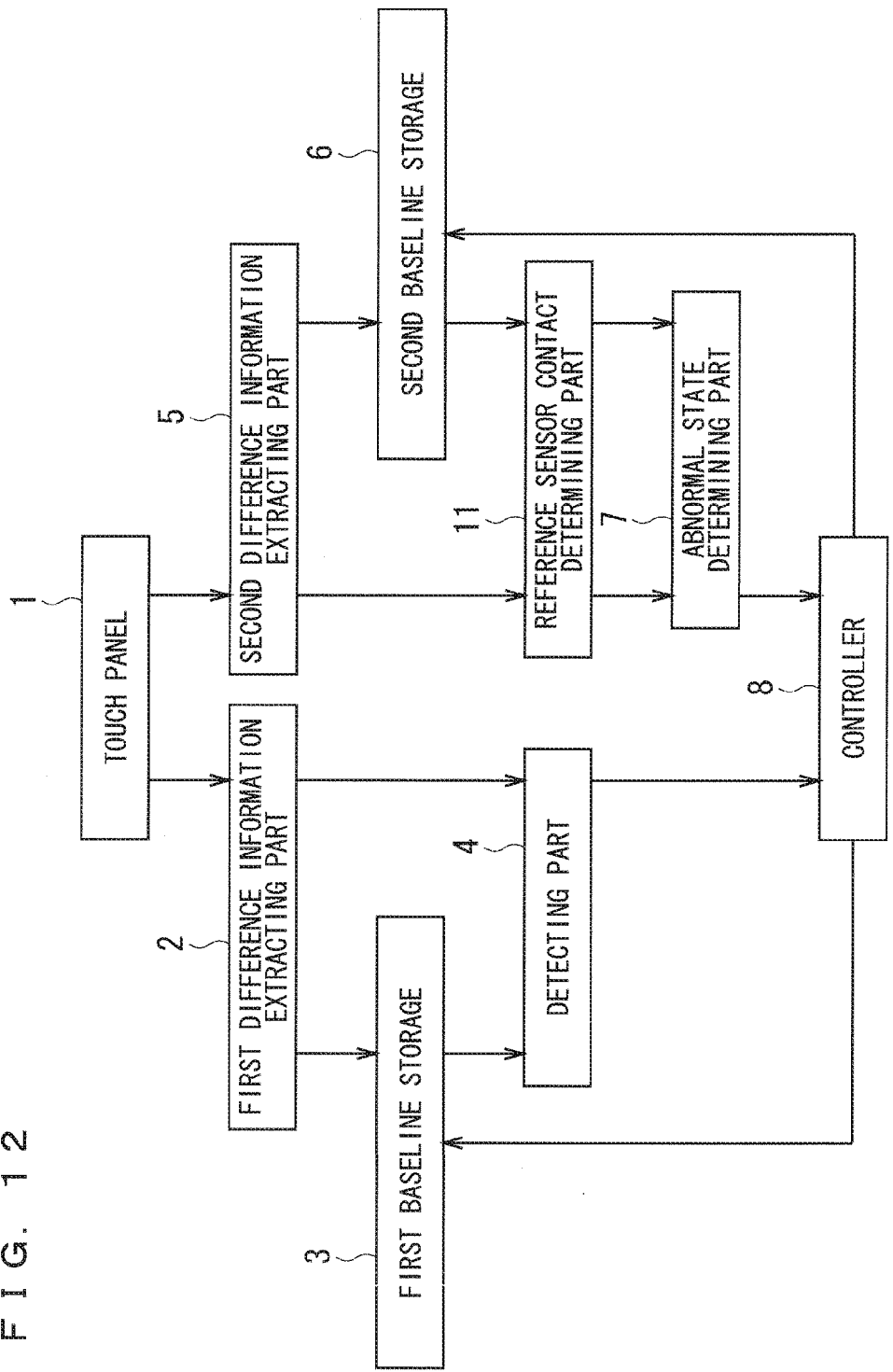
FIG. 12 is a block diagram showing an example of the structure of a touch panel device according to a second preferred embodiment of the present invention.

FIG. 12 is a block diagram showing an example of the structure of the touch panel device according to the second preferred embodiment of the present invention. Elements common to or corresponding to those of FIG. 1 (first preferred embodiment) are identified by the same reference numbers, and are not described here.

As shown in FIG. 12, the touch panel device of the second preferred embodiment includes a reference sensor contact determining part 11 that determines if a detection target contacts a reference sensor.

FIG. 13 shows the structure of a touch panel 1. As shown in FIG. 13, the touch panel 1 of the second preferred embodiment includes a dummy sensor 12 arranged in a region outside a detection region 9 where sensors X and sensors Y are arranged.

The operation of the touch panel device is explained next by referring to FIGS. 14 to 20.

Figure 14:
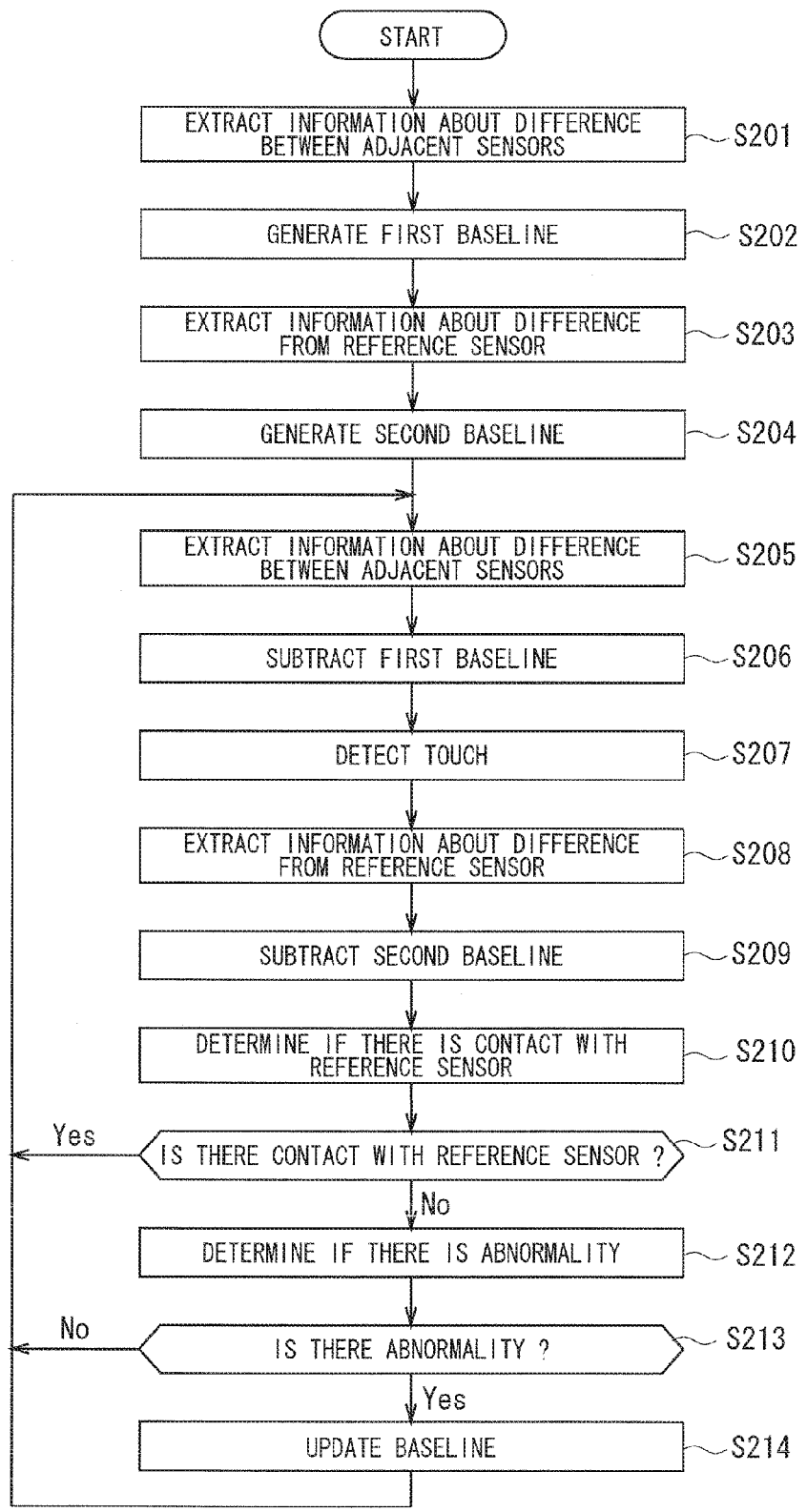
FIG. 14 is a flowchart explaining an example of the operation of the touch panel device according to the second preferred embodiment of the present invention.

FIG. 14 is a flowchart explaining an example of the operation of the touch panel device. In FIG. 14, steps S201 to S204 correspond to initialization operation performed for example immediately after power-on of the touch panel device, and step S205 and its subsequent steps correspond to steady operation. The processes in steps S201 to S208 of FIG. 14 are the same as those in steps S101 to S108 of FIG. 3 respectively.

In step S201, the first difference information extracting part 2 measures respective differences in capacitance between adjacent sensors, and extracts the measured differences as pieces of first difference information.

In step S202, the first baseline storage 3 stores, as first baselines, the pieces of the first difference information input from the first difference information extracting part 2.

In step S203, the second difference information extracting part 5 measures a difference in capacitance between each of the sensors X and each of the sensors Y of the touch panel 1, and a reference sensor. Then, the second difference information extracting part 5 extracts the measured differences as pieces of second difference information. In the second preferred embodiment, the dummy sensor 12 is described as the reference sensor.

Figure 15:
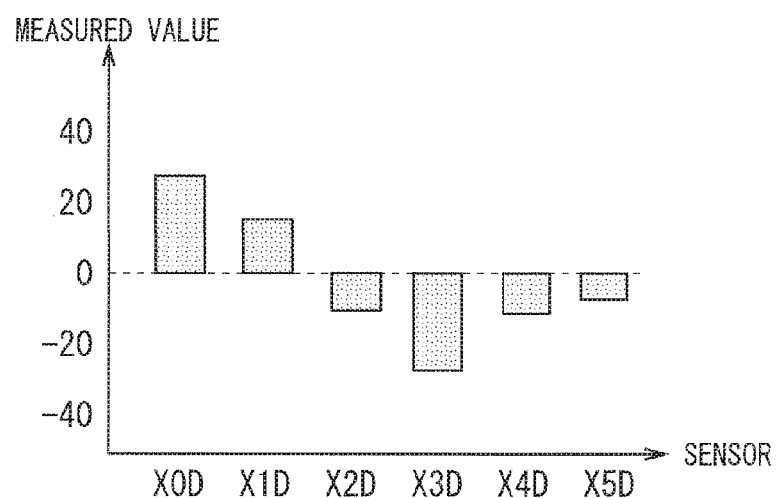
FIG. 15 shows exemplary values measured by a second difference information extracting part in the absence of a touch in the second preferred embodiment of the present invention.

FIG. 15 shows exemplary differences in capacitance (measured values) between each of the sensors X and the dummy sensor 12 obtained by the second difference information extracting part 5 in the absence of an object contacting the touch panel 1 by using the sensors X of the touch panel 1 shown in FIG. 13.

As shown in FIG. 15, a measured value XmD indicates a difference in capacitance between the sensor Xm and the dummy sensor 12. (As an example, a measured value X0D indicates a difference in capacitance between the sensor X0 and the dummy sensor 12, and corresponds to a result obtained by subtracting the capacitance value of the dummy sensor 12 from that of the sensor X0.) While FIG. 15 only shows the results about the sensors X, the second difference information extracting part 5 extracts the second difference information about the sensors Y in the same manner.

In step S204, the second baseline storage 6 stores, as second baselines, the pieces of the second difference information input from the second difference information extracting part 5.

Like in step S201, the first difference information extracting part 2 measures respective differences in capacitance between adjacent sensors, and extracts the measured differences as pieces of the first difference information in step S205.

In step S206, the detecting part 4 subtracts the first baselines stored in the first baseline storage 3 from the pieces of the first difference information measured and extracted in step S205.

In step S207, based on the subtraction results obtained in step S206, the detecting part 4 determines the presence or absence of a touch on the touch panel 1 with a finger and detects a touched position in the presence of the touch.

Like in step S203, the second difference information extracting part 5 measures a difference in capacitance between each of the sensors X and each of the sensors Y of the touch panel 1, and the dummy sensor 12. Then, the second difference information extracting part 5 extracts the measured differences as pieces of the second difference information in step S208.

Figure 16:
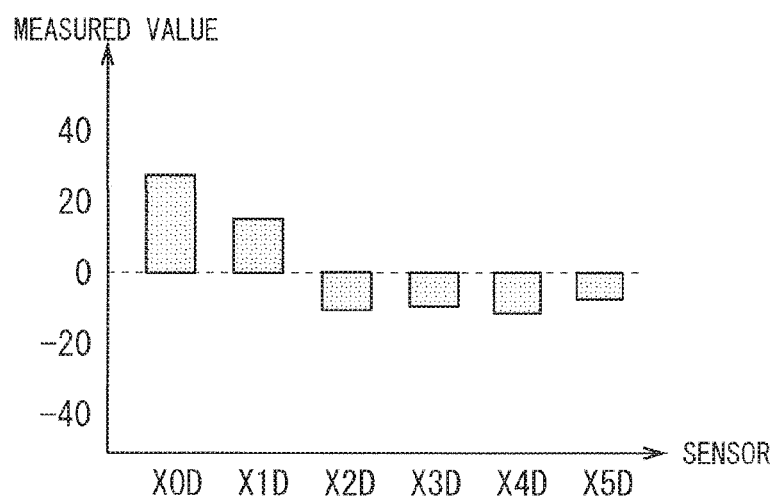
FIG. 16 shows exemplary values measured by the second difference information extracting part in the presence of a touch in the second preferred embodiment of the present invention.
Figure 17:
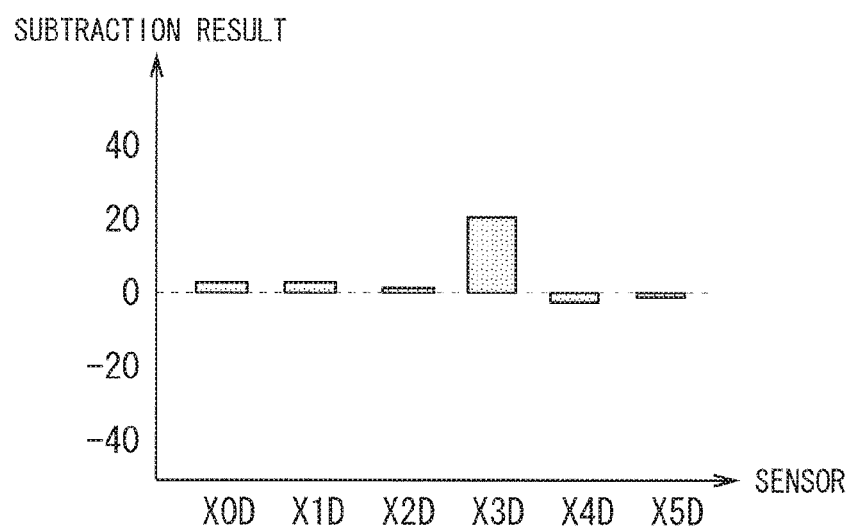
FIG. 17 shows exemplary results obtained by subtracting second baselines from the values measured by the second difference information extracting part in the presence of a touch in the second preferred embodiment of the present invention.
Figure 18:
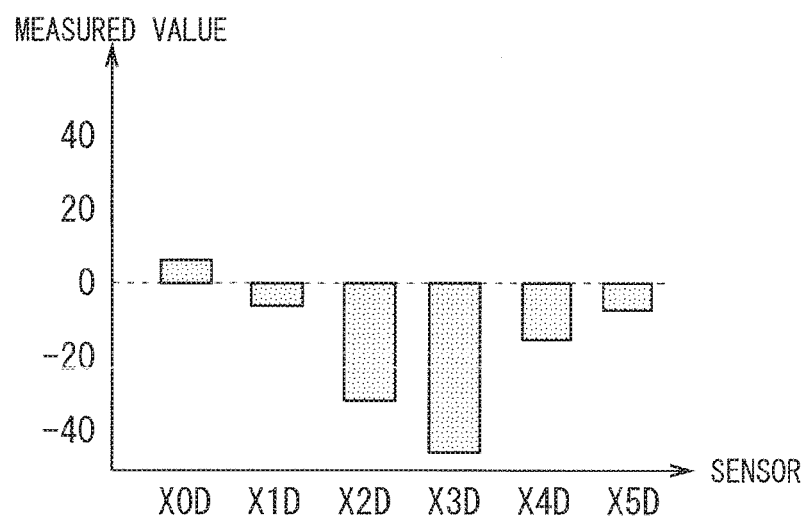
FIG. 18 shows exemplary values measured by the second difference information extracting part in the presence of a touch on a dummy sensor in the second preferred embodiment of the present invention on a dummy sensor.

In step S209, the reference sensor contact determining part 11 subtracts the second baselines stored in the second baseline storage 6 from the pieces of the second difference information measured and extracted in step S208. Assuming that the values of FIG. 15 are the second baselines for the sensors X and the values of FIG. 16 are the pieces of the second difference information measured and extracted in step S208, for example, subtraction results about the sensors X are those shown in FIG. 17.

In steps S210 and S211, based on the subtraction results obtained in step S209, the reference sensor contact determining part 11 determines if the reference sensor has been touched (in contact).

Figure 19:
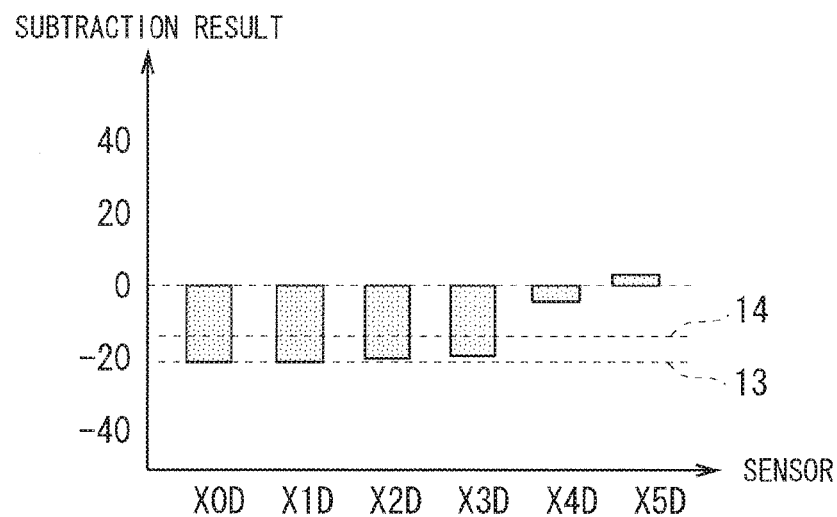
FIG. 19 shows exemplary results obtained by subtracting second baselines from the values measured by the second difference information extracting part in the presence of a touch on the dummy sensor in the second preferred embodiment of the present invention.

As in the first preferred embodiment, if the reference sensor has not been touched, it can be determined if there is an abnormal state based on if the subtraction results include a negative value. Meanwhile, if the reference sensor has been touched, negative values such as X0D to X3D of FIG. 19 are generated even if the second baselines are appropriate. Thus, the processes in steps S210 and S211 are performed prior to determination about an abnormal state with the intention of determining if the reference sensor has been touched, thereby checking to see if determination about an abnormal state can be made correctly (specifically, if the reference sensor has been touched).

Described below is how the values of FIG. 19 are generated. The touch panel 1 of the second preferred embodiment includes the dummy sensor 12 arranged on the right of the sensor X5 (on the right in the plane of FIG. 13). Thus, if a vicinity of the dummy sensor 12 is being touched, the touch affects the sensors X5 and X4 to increase the capacitance values of the sensors X5 and X4. Meanwhile, the touch does not affect the sensors X0 and X3 away from the dummy sensor 12. This touch increases the capacitance value of the dummy sensor 12. Thus, X0D to X3D are reduced by the increase of the capacitance value of the dummy sensor 12, compared to corresponding measured values (differences) obtained in the absence of a touch. Meanwhile, X4D and X5D are increased by respective amounts determined by subtracting the increase of the capacitance value of the dummy sensor 12 from respective increases of the capacitance values of the sensors X4 and X5, compared to corresponding measured values (differences) obtained in the absence of a touch. As a result, assuming that the values of FIG. 15 are the differences measured in step S208 in the absence of a touch, differences measured in the presence of a touch on the dummy sensor 12 are those of FIG. 18 and the subtraction results obtained in step S209 are the values of FIG. 19. As shown in FIG. 19, X0D to X3D are changed by substantially the same amount (amount of reduction) corresponding to the increase of the capacitance of the dummy sensor 12. If many (a plurality of) negative values similar to each other are generated, it is very likely that there is a touch on the dummy sensor 12.

Figure 20:
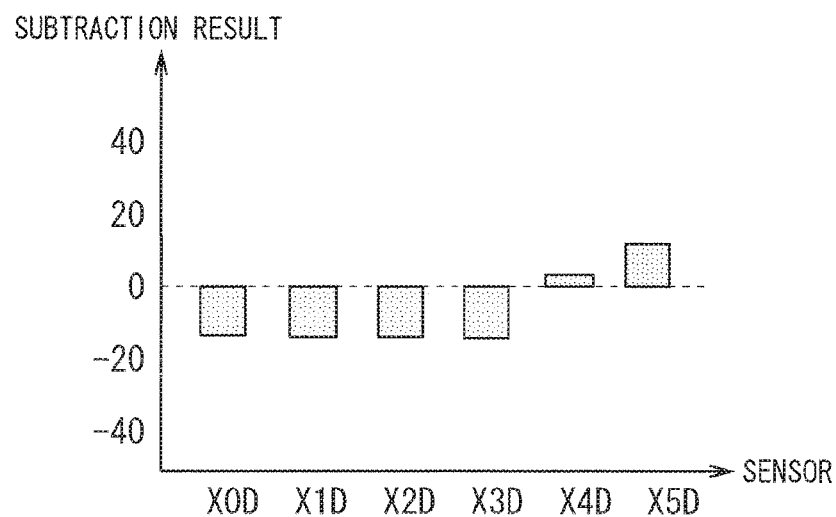
FIG. 20 shows different exemplary results obtained by subtracting second baselines from the values measured by the second difference information extracting part in the presence of a touch on the dummy sensor in the second preferred embodiment of the present invention.

The values of FIG. 20 show different possible examples of subtraction results obtained in the presence of a touch on a vicinity of the dummy sensor 12. The values of FIG. 20 is obtained when a finger touches space between the dummy sensor 12 and the sensor X5. In this case, the finger is closer to the sensor X5 and slightly farther from the dummy sensor 12 than in the case of FIG. 19. Thus, all the values of FIG. 20 are greater than those of FIG. 19 and particularly, the value of X5D is larger than that of FIG. 19. This means that it is also very likely that there is a touch on the dummy sensor 12 if there is a large difference in capacitance between a sensor (here, sensor X5) adjacent to the dummy sensor 12 and the dummy sensor 12.

The reference sensor contact determining part 11 checks the following two conditions (hereinafter also called contact conditions) to determine that a reference sensor has been touched if one of the contact conditions is satisfied. More specifically, a first contact condition is satisfied if the subtraction results obtained in step S209 include values not lower than an minimum of 13 and not larger than a value 14 obtained by adding a constant number to the minimum of 13 (FIG. 19), and if the number of these values is the same as or larger than a predetermined threshold C1. To be specific, if a difference between the second difference information extracted by the second difference information extracting part 5 and the second baseline stored in the second baseline storage 6 falls within a certain range, and if the number of such differences is the same as or larger than a predetermined number of sensors, the reference sensor contact determining part 11 determines that there is a touch on a reference sensor (a detection target contacts the reference sensor).

A second contact condition is satisfied if the value of a subtraction result about a calibrating sensor among the subtraction results obtained in step S209 is the same as or larger than a predetermined threshold C2. The calibrating sensor mentioned herein is a sensor including one adjacent to a reference sensor. In the second preferred embodiment, the sensor X5 (see FIG. 13) corresponds to the calibrating sensor. To be specific, based on a difference in capacitance between the calibrating sensor and the reference sensor, the reference sensor contact determining part 11 determines if a detection target (here, a user's finger) contacts the reference sensor.

Assuming that the threshold C1 of the first contact condition is 4 and the threshold C2 of the second contact condition is 10, for example, the case of FIG. 19 is subjected to determination by applying these thresholds C1 and C2. The values of X0D to X3D satisfy the value defined by first contact condition and the number of these values is four, thereby satisfying the first contact condition. Thus, the reference sensor contact determining part 11 determines that there is contact (touch) with the reference sensor. Regarding the case of FIG. 20, the second contact condition is satisfied if the value of X5D is larger than the threshold C2 (=10).

If the reference sensor contact determining part 11 determines that there is a touch on the reference sensor, the flow proceeds to step S205 and the process in step S212 (determination about an abnormal state) and processes in the subsequent steps are not performed. Meanwhile, if the reference sensor contact determining part 11 determines that there is no touch on the reference sensor, the flow proceeds to step S212.

The processes in steps S212 to S214 are the same as those in steps S110 to S112 of FIG. 3 respectively. To be specific, the abnormal state determining part 7 determines if there is an abnormal state. If the abnormal state determining part 7 determines that there is an abnormal state (YES in step S213), baselines (first base lines and second base lines) are updated in step S214.

As described above, in the second preferred embodiment, the dummy sensor 12 arranged outside the detection region 9 is used as a reference sensor. This prevents erroneous determination about an abnormal state due to touch on the reference sensor. Further, the presence or absence of contact with the reference sensor is determined based on the second difference information. Thus, even if there is a touch on the reference sensor, it will not be determined erroneously that there is an abnormal state.

In the second preferred embodiment, the dummy sensor 12 is described as being arranged adjacent to the sensor X5. However, this is not the only example. The dummy sensor 12 may be arranged at any position outside the detection region 9. As an example, the dummy sensor 12 can be arranged on the left side of the sensor X0, above the sensor Y0, or below the sensor Y4.

The dummy sensor 12 is described as having an elongated shape. However, this is not the only example of the shape of the dummy sensor 12, but the dummy sensor 12 may have a different shape such as a round shape. The dummy sensor 12 may also be an electronic device such as a capacitor having a fixed capacitance.

A calibrating sensor is described as one adjacent to a reference sensor. However, this is not the only example. A plurality of sensors (sensors X4 and X5, for example) can be used as calibrating sensors.

The first and second conditions are not the only conditions for determining the presence of contact with a reference sensor, but the determination can be made based on a different condition.

<Third Preferred Embodiment>

The structure of a touch panel device according to a third preferred embodiment of the present invention is described first.

FIG. 21 shows the structure of a touch panel 1 of the third preferred embodiment.

As shown in FIG. 21, the touch panel device of the third preferred embodiment is formed by adding a dummy sensor 15 to the touch panel 1 of the second preferred embodiment (FIG. 13). The dummy sensor 15 is arranged outside the detection region 9 where the sensors X and the sensors Y are arranged. The structure of FIG. 21 is the same in other respects as that of FIG. 12 or 13 of the second preferred embodiment, so that the common structures are not described here.

The operation of the touch panel device is explained next by referring to FIGS. 22 to 28.

Figure 22:
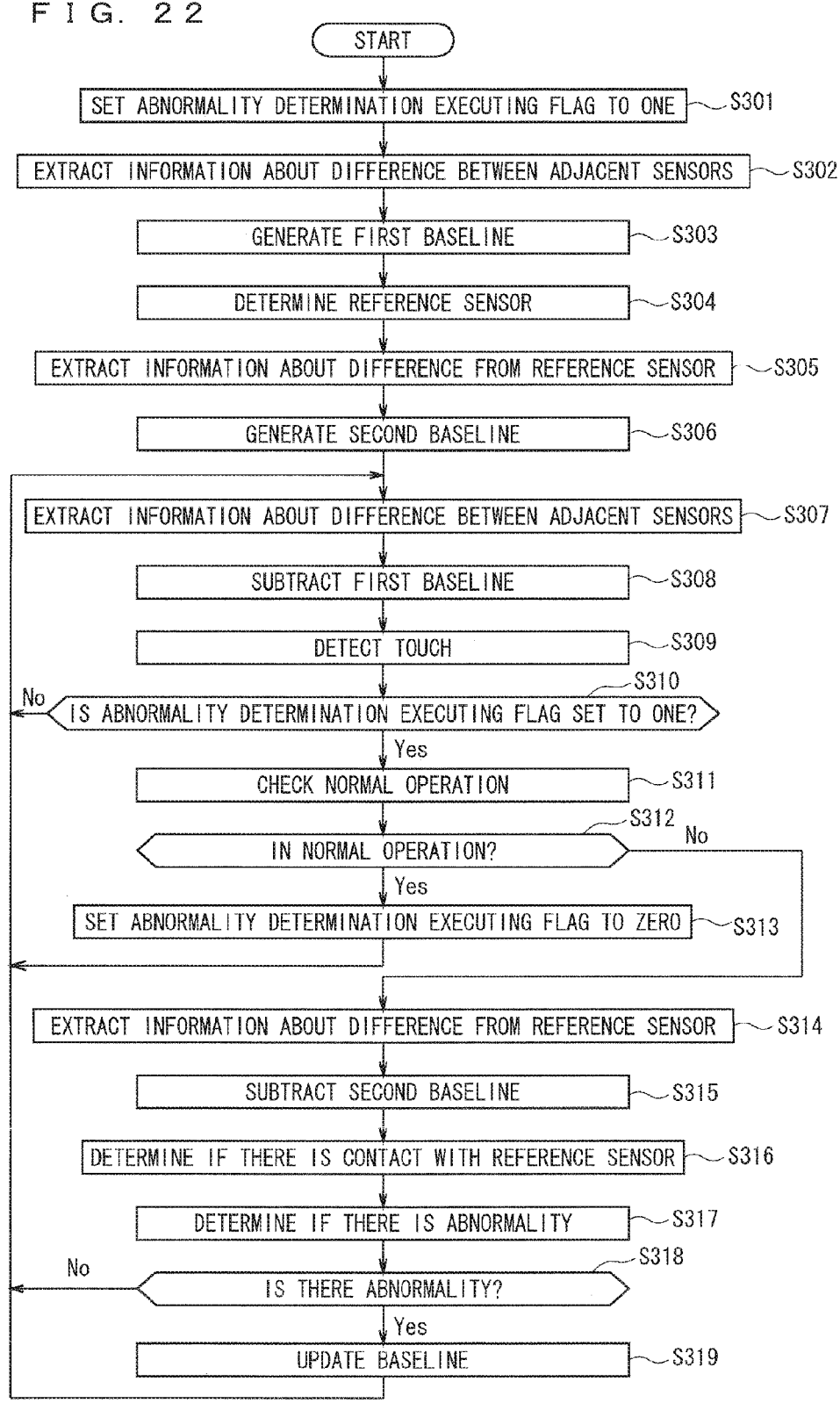
FIG. 22 is a flowchart explaining an example of the operation of a touch panel device according to the third preferred embodiment of the present invention.

FIG. 22 is a flowchart explaining an example of the operation of the touch panel device. In FIG. 22, steps S301 to S306 correspond to initialization operation performed for example immediately after power-on of the touch panel device, and step S307 and its subsequent steps correspond to steady operation.

In step S301, an abnormality determination executing flag is initialized to 1. The abnormality determination executing flag is used in determining if process relating to determination about abnormality is to be performed. If the abnormality determination executing flag is 0, the process relating to determination about abnormality is not performed.

Like in step S101 of FIG. 3, the first difference information extracting part 2 measures respective differences in capacitance between adjacent sensors, and extracts the measured differences as pieces of first difference information in step S302. Like in step S102 of FIG. 3, the first baseline storage 3 stores, as first baselines, the pieces of the first difference information in step S303 input from the first difference information extracting part 2.

In step S304, the second difference information extracting part 5 determines a reference sensor.

A measuring unit generally has a measurable range, and cannot make measurement correctly if the range is exceeded. This also applies to the second difference information extracting part 5. The process in step S304 is intended to select an appropriate reference sensor in order for second difference information, to be extracted by the second difference information extracting part 5, to fall within a measurable range.

In the example described in the third preferred embodiment, either the dummy sensor 12 or the sensor X5 is selected as a reference sensor for the sensors X, and either the dummy sensor 15 or the sensor Y4 is selected as a reference sensor for the sensors Y. This corresponds to an example where the second difference information extracting part 5 extracts the second difference information by using a reference sensor for the sensors X being a group of sensors arranged in the horizontal direction of the touch panel 1, and a different reference sensor for the sensors Y being a group of sensors arranged in the vertical direction of the touch panel 1.

More specifically, in step S304, the second difference information extracting part 5 extracts the respective pieces of the second difference information by using target sensors (candidate sensors for a reference sensor), and a sensor providing values of the pieces of the second difference information falling within a range of from −50 to 50 is selected as a reference sensor. If all the target sensors provide values falling within this range, a dummy sensor is selected as a reference sensor. To be specific, the second difference information extracting part 5 selects, as candidate sensors for a reference sensor, at least two or more sensors from a plurality of sensors, obtains a difference in capacitance between each of these candidate sensors and a sensor among the plurality of sensors and different from this candidate sensor, and based on the resultant differences, determines which of the candidate sensors is to become a reference sensor.

Figure 23:
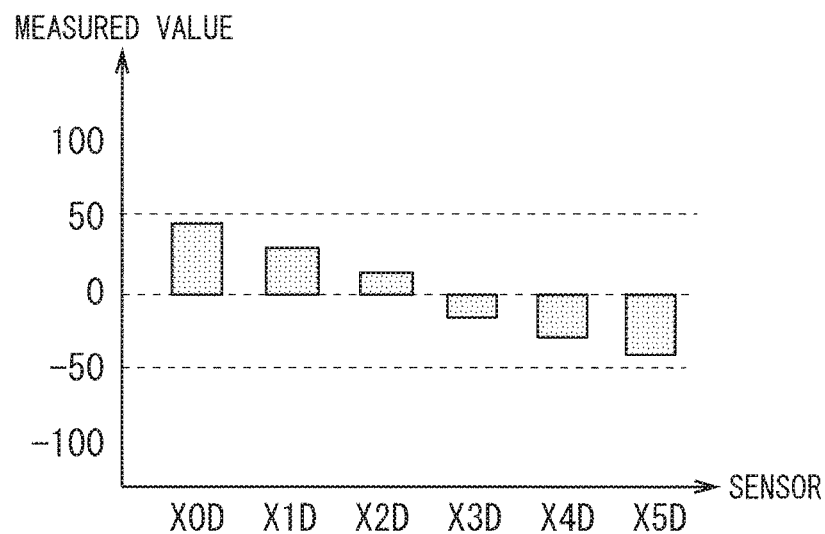
FIG. 23 shows exemplary values measured about sensors X by a second difference information extracting part by using a dummy sensor as a reference sensor in the third preferred embodiment of the present invention.
Figure 24:
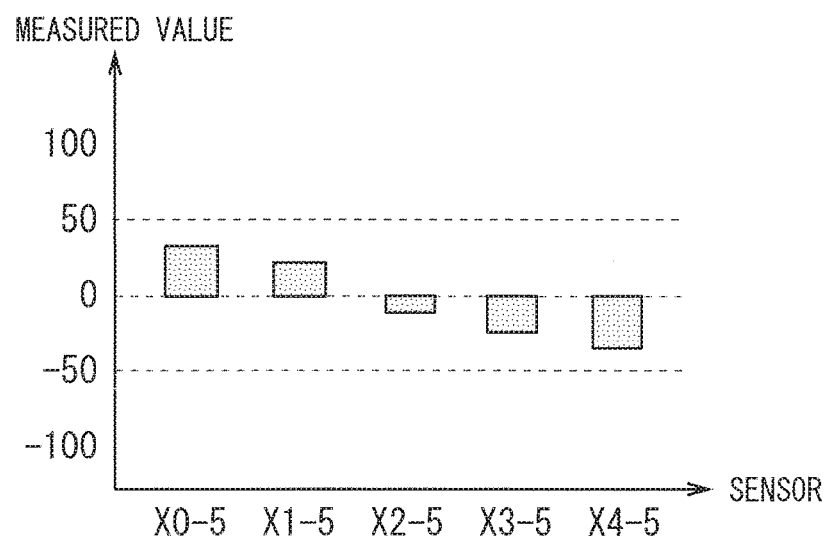
FIG. 24 shows exemplary values measured for the sensors X excluding a sensor X5 by the second difference information extracting part by using the sensor X5 as a reference sensor in the third preferred embodiment of the present invention.
Figure 25:
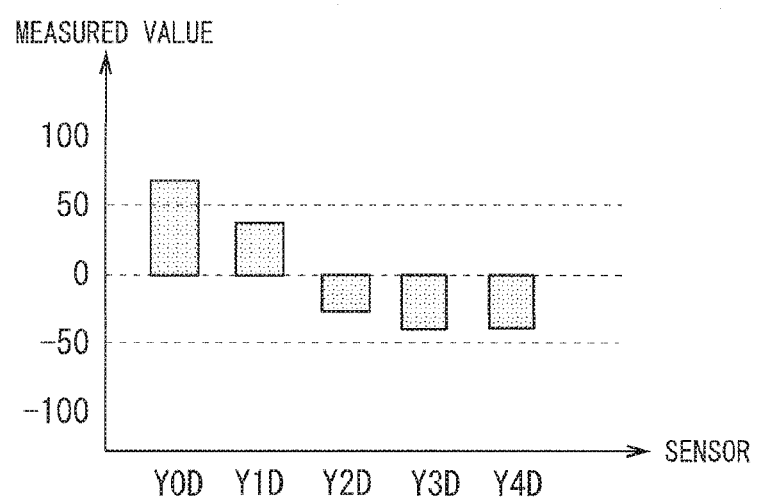
FIG. 25 shows exemplary values measured about sensors Y by the second difference information extracting part by using a dummy sensor as a reference sensor in the third preferred embodiment of the present invention.
Figure 26:
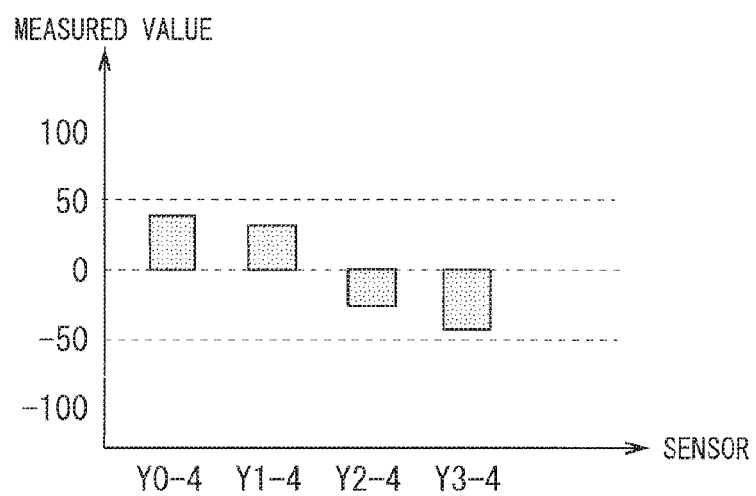
FIG. 26 shows exemplary values measured about the sensors Y excluding a sensor Y4 by the second difference information extracting part by using the sensor Y4 as a reference sensor in the third preferred embodiment of the present invention.

Regarding the sensors X, assuming that measured values (pieces of the second difference information) of FIG. 23 are those obtained by using the dummy sensor 12 as a reference sensor and measured values of FIG. 24 are those obtained by using the sensor X5 as a reference sensor, for example, both the measured values obtained by using the dummy sensor 12 and the sensor X5 fall within the aforementioned range. Thus, the dummy sensor 12 is selected as a reference sensor. Regarding the sensors Y, assuming that measured values of FIG. 25 are those obtained by using the dummy sensor 15 as a reference sensor and measured values of FIG. 26 are those obtained by using the sensor Y4 as a reference sensor, for example, only the measured values obtained by the sensor Y4 (see FIG. 26) fall within the range. Thus, the sensor Y4 is selected as a reference sensor.

In step S305, by using the dummy sensor 12 as a reference sensor for the sensors X and the sensor Y4 as a reference sensor for the sensors Y, the second difference information extracting part 5 measures a difference in capacitance between the reference sensor and each of the sensors X and a difference in capacitance between the reference sensor and each of the sensors Y, and extracts the measured differences as pieces of the second difference information.

Like in step S104 of FIG. 3, the second baseline storage 6 stores, as second baselines, the pieces of the second difference information about the sensors X and those about the sensors Y in step S306 input from the second difference information extracting part 5.

Like in step S105 of FIG. 3, the first difference information extracting part 2 measures respective differences in capacitance between adjacent sensors, and extracts the measured differences as pieces of the first difference information in step S307.

In step S308, the detecting part 4 subtracts the first baselines stored in the first baseline storage 3 from the pieces of the first difference information measured and extracted in step S307.

In step S309, based on the subtraction results obtained in step S308, the detecting part 4 determines the presence or absence of a touch on the touch panel 1 with a finger and detects a touched position in the presence of the touch.

In step S310, it is determined if the abnormality determination executing flag is 1. If the abnormality determination executing flag is 1, the flow proceeds to step S311. If the abnormality determination executing flag is not 1, the flow proceeds to step S307. The process in step S310 may be performed by the controller 8.

In steps S311 and S312, the controller 8 performs process to check to see if the touch panel device is in a normal operating state (normal operation checking process).

An abnormal state of the touch panel device is generated due to the presence of a touch on the touch panel 1 during initialization time immediately after power-on of the touch panel device (time when the first base lines and the second base lines are generated in steps S301 to S306). Thus, if it is determined reliably that the touch panel device is not in an abnormal state, process for making determination about abnormality becomes needless thereafter, and the first baselines and the second base lines will not be updated erroneously thereafter.

Thus, in the third preferred embodiment, if the normal operation of the touch panel device is confirmed (Yes in step S312), the abnormality determination executing flag is set to 0 (step S313) and process for making determination about abnormality is not performed thereafter. Meanwhile, if the normal operation of the touch panel device is not confirmed (No in step S312), the process in step S314 and those in subsequent steps for making determination about abnormality are performed.

In the normal operation checking process in step S311, by referring to history information about a result of detection of a touch additionally stored in the detecting part 4, for example, if there was a one-point touch lasted for a predetermined period of time or more in the past and if a condition with no touch lasted thereafter for a predetermined period of time or more, the touch panel device is determined to operate normally. Meanwhile, if erroneous touches on multiple points were detected repeatedly within a short period of time or if the presence of an erroneous touch continued, the touch panel device is determined to be an abnormal state. Hence, reliably checking change of a state from the presence of one-point touch to the absence of a touch is one of ways of confirming the normal operation of the touch panel device.

Like in step S305, the second difference information extracting part 5 measures a difference in capacitance between the reference sensor and each of the sensors X and a difference in capacitance between the reference sensor and each of the sensors Y, and extracts the measured differences as pieces of the second difference information in step S314.

Like in step S209 of FIG. 14, in step S315, the reference sensor contact determining part 11 subtracts the second baselines stored in the second baseline storage 6 from the pieces of the second difference information measured and extracted in step S314.

Like in step S210 of FIG. 14, based on the subtraction results obtained in step S315, the reference sensor contact determining part 11 determines if the reference sensors have been touched (in contact) in step S316.

In the third preferred embodiment, the sensor X5 nearest the reference sensor (dummy sensor 12) for the sensors X is used as a calibrating sensor for the sensors X, and the sensor Y3 nearest the reference sensor (sensor Y4) for the sensors Y is used as a calibrating sensor for the sensors Y. Thus, assuming that the subtraction results about the sensors X obtained in step S315 are those shown in FIG. 27 and the subtraction results about the sensors Y obtained in step S315 are those shown in FIG. 28, for example, the reference sensor contact determining part 11 determines that there is no contact with the reference sensor for the sensors X, whereas it determines that there is contact with the reference sensor for the sensors Y as the value of Y3-4 considerably larger than the aforementioned threshold of the second contact condition (second preferred embodiment) so it satisfies the second contact condition.

In the second preferred embodiment, it is determined if determination about an abnormal state is to be made based on a result of determination about contact (steps S210 and S211 of FIG. 14). In the third preferred embodiment, determination about an abnormal state is made irrespective of a result of determination about contact (step S317). Based on the result of the determination about contact and a result of the determination about an abnormal state, final determination is made about an abnormal state (step S318).

In step S317, the abnormal state determining part 7 makes determination about an abnormal state for both the sensors X and the sensors Y. As an example, the subtraction results of FIG. 27 about the sensors X satisfy the aforementioned abnormality condition (described in the first preferred embodiment), so that the abnormal state determining part 7 determines that there is an abnormal state. Meanwhile, regarding the subtraction results of FIG. 28 about the sensors Y, the abnormal state determining part 7 determines that there is no abnormal state.

Figure 27:
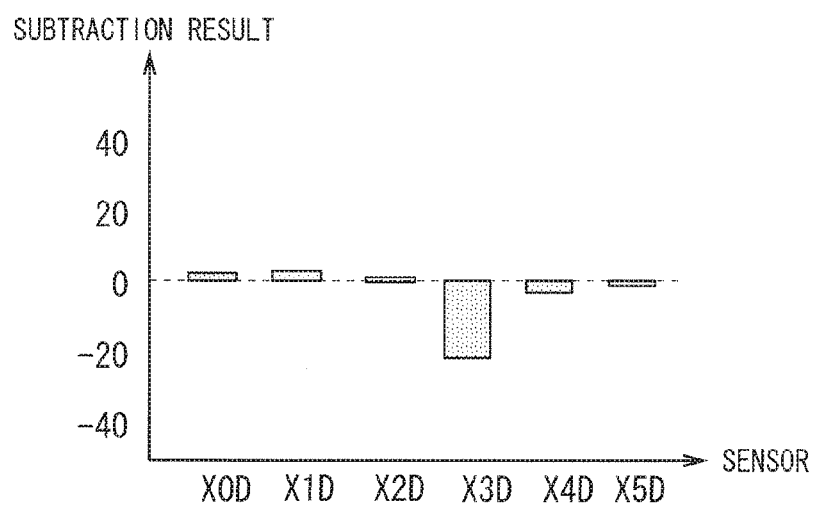
FIG. 27 shows exemplary results obtained by subtracting second baselines from the values measured about the sensors X by the second difference information extracting part in the third preferred embodiment of the present invention.
Figure 28:
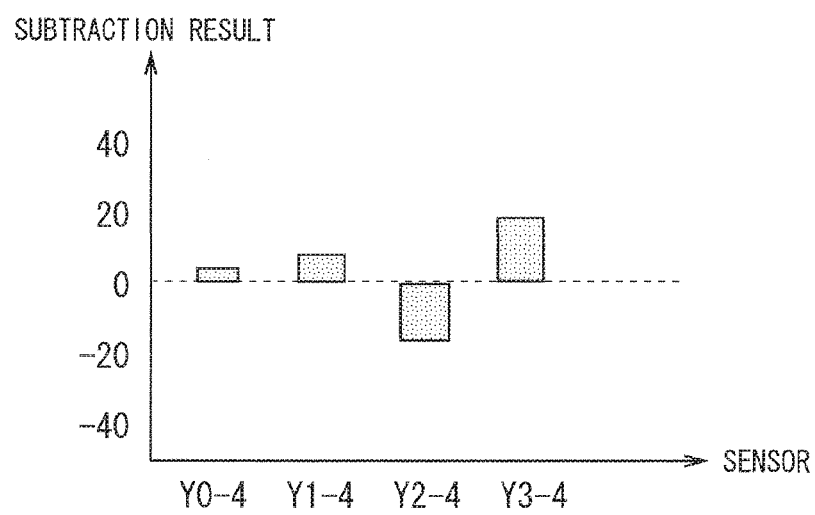
FIG. 28 shows exemplary results obtained by subtracting second baselines from the values measured about the sensors Y by the second difference information extracting part in the third preferred embodiment of the present invention.

In step S318, based on the result of the determination about contact obtained in step S316 and the result of the determination about abnormality obtained in step S317, the abnormal state determining part 7 determines if there is an abnormal state. As an example, if either the sensors X or the sensors Y are determined to "have no contact" and "have abnormality," for example, the abnormal state determining part 7 determines that there is an abnormal state. In the examples of FIGS. 27 and 28, the sensors X shown in FIG. 27 are determined to "have no contact" and "have abnormality," so that the abnormal state determining part 7 determines that there is an abnormal state.

In step S319, if it is determined that there is an abnormal state in step S318 (Yes in step S318), the first baselines and the second baselines are updated like in step S112 of FIG. 3.

As described above, in the third preferred embodiment, an optimum reference sensor is selected based on a measured value obtained during initialization operation (step S304 of FIG. 22). This allows determination about an abnormal state without being affected by change of an ambient environment such as change of an installation place for the touch panel device. Further, both the sensors X and the sensors Y are subjected to determination about contact and determination about abnormality, and the presence or absence of an abnormal state is determined based on results of these determinations. Thus, the presence or absence of an abnormal state can be made more precisely. After it is determined that the touch panel device is in a normal operating state, determination about an abnormal state is not made. This advantageously reduces entire processing time and minimizes the possibility of making erroneous determination.

In the third preferred embodiment, a reference sensor is selected during initialization operation (step S304 of FIG. 22). However, this is not the only example. A reference sensor may be selected only when an operator gives instructions to do so during adjustment of the touch panel device, for example.

A reference sensor is selected from the dummy sensor 12 and the sensor X5 (candidate sensors) for the sensors X, and is selected from the dummy sensor 15 and the sensor Y4 (candidate sensors) for the sensors Y. A reference sensor for the sensors X and that for the sensors Y can be selected from a wider range of selection. As an example, the sensor X0 or Y0 can be added to the range of selection.

In selecting a reference sensor, pieces of the second difference information are extracted by using the dummy sensor 12 and one of the sensors X as candidate sensors, and by using the dummy sensor 15 and one of the sensors Y as candidate sensors. Then, a sensor is selected as a reference sensor if the values of extracted pieces of the second difference information obtained by using this sensor fall within a predetermined range. However, this is not the only example of a way of selecting a reference sensor but the reference sensor can be selected by a different way. As an example, a sensor may be selected as a reference sensor if a difference between the maximum value and the minimum value among the values of pieces of the second difference information extracted by this sensor is smaller.

The touch panel device is determined to operate normally if there was a one-point touch lasted for a predetermined period of time or more in the past and if a condition with no touch lasted thereafter for a predetermined period of time or more. However, this is not the only example. The touch panel device may also be determined to operate normally in response to different operation such as several transitions between a state with a touch and a state without a touch.

In the first to third preferred embodiments, six sensors X and five sensors Y are arranged in the detection region 9 of the touch panel 1. However, this is not the only example but more or fewer sensors X and more or fewer sensors Y can be provided.

At a maximum of one dummy sensor is provided to be adjacent to the sensors X and at a maximum of one dummy sensor is provided to be adjacent to the sensors Y. However, this is not the only example but more sensors arranged at different positions may be selected as reference sensors. Additionally, a dummy sensor adjacent to the sensors X can be selected as a reference sensor for the sensors Y, and a dummy sensor adjacent to the sensors Y can be selected as a reference sensor for the sensors X.

Both the sensors X and the sensors Y are used in making determination about an abnormal state. However, this is not the only example. Either the sensors X or the sensors Y may be used in making determination about an abnormal state.

Each of the first difference information extracting part 2, the detecting part 4, the second difference information extracting part 5, the abnormal state determining part 7, the controller 8, and the reference sensor contact determining part 11 can be configured as hardware (such as an arithmetic processing circuit that performs specific arithmetic operation or processing on an electric signal), can be realized by executing software-based processing on a program using a CPU, or can be realized by a combination of these alternatives.

The first and second baseline storages 3 and 6 can be composed of semiconductor memories or resistors, for example.

The preferred embodiments of the present invention can be combined freely, and each of the preferred embodiments can be modified or omitted where appropriate without departing from the scope of the invention.

While the invention has been shown and described in detail, the foregoing description is in all aspects illustrative and not restrictive. It is therefore understood that numerous modifications and variations can be devised without departing from the scope of the invention.

What is claimed is:
1. A touch panel device, comprising:
a touch panel having a plurality of sensors that measure a capacitance;
a first difference information extracting part that extracts, as first difference information, a difference in capacitance between adjacent ones of said plurality of sensors;
a first baseline storage that stores, as a first base line, said first difference information extracted by said first difference information extracting part when a detection target is not in proximity to or does not contact said touch panel;
a detecting part that detects proximity to or contact with said touch panel by said detection target based on said first difference information extracted by said first difference information extracting part and said first baseline stored in said first baseline storage;
a second difference information extracting part that extracts, as second difference information, a difference in capacitance between a reference sensor being a predetermined sensor among said plurality of sensors and a sensor among said plurality of sensors and different from said reference sensor;
a second baseline storage that stores, as a second baseline, said second difference information extracted by said second difference information extracting part when said detection target is not in proximity to or does not contact said touch panel;
an abnormal state determining part that determines the presence of an abnormal state based on said second difference information extracted by said second difference information extracting part and said second baseline stored in said second baseline storage; and
a controller that, in response to said abnormal state determining part determining that there is an abnormal state, controls to update said first and second baselines stored in said first and second baseline storages respectively, wherein said reference sensor used for extraction of said second difference information by said second difference information extracting part is different between a group of sensors among said plurality of sensors and arranged in a horizontal direction of said touch panel, and a group of sensors among said plurality of sensors and arranged in a vertical direction of said touch panel, and said abnormal state determining part determines if there is an abnormal state about each of said groups of sensors.

2. The touch panel device according to claim 1, wherein said controller determines if said touch panel device is in a normal operating state, and if said controller determines that said touch panel device is in said normal operating state, said abnormal state determining part does not determine if there is an abnormal state.

3. The touch panel device according to claim 1, wherein said second difference information extracting part selects, as candidate sensors for said reference sensor, at least two or more sensors from said plurality of sensors, obtains a difference in capacitance between each of these candidate sensors and a sensor among said plurality of sensors and different from this candidate sensor, and based on the resultant differences, determines which of said candidate sensors is to become said reference sensor.

4. A touch panel device, comprising:
a touch panel having a plurality of sensors that measure a capacitance;
a first difference information extracting part that extracts, as first difference information, a difference in capacitance between adjacent ones of said plurality of sensors;
a first baseline storage that stores, as a first base line, said first difference information extracted by said first difference information extracting part when a detection target is not in proximity to or does not contact said touch panel;
a detecting part that detects proximity to or contact with said touch panel by said detection target based on said first difference information extracted by said first difference information extracting part and said first baseline stored in said first baseline storage;
a second difference information extracting part that extracts, as second difference information, a difference in capacitance between a reference sensor being a predetermined sensor among said plurality of sensors and a sensor among said plurality of sensors and different from said reference sensor;
a second baseline storage that stores, as a second baseline, said second difference information extracted by said second difference information extracting part when said detection target is not in proximity to or does not contact said touch panel;
an abnormal state determining part that determines the presence of an abnormal state based on said second difference information extracted by said second difference information extracting part and said second baseline stored in said second baseline storage; and
a controller that, in response to said abnormal state determining part determining that there is an abnormal state, controls to update said first and second baselines stored in said first and second baseline storages respectively, wherein said controller determines if said touch panel device is in a normal operating state, if said controller determines that said touch panel device is in said normal operating state, said abnormal state determining part does not determine if there is an abnormal state, said reference sensor used for extraction of said second difference information by said second difference information extracting part is different between a group of sensors among said plurality of sensors and arranged in a horizontal direction of said touch panel, and a group of sensors among said plurality of sensors and arranged in a vertical direction of said touch panel, and said abnormal state determining part determines if there is an abnormal state about each of said groups of sensors.

5. A touch panel device, comprising:
a touch panel having a plurality of sensors that measure a capacitance;
a first difference information extracting part that extracts as first difference information difference in capacitance between adjacent ones of said plurality of sensors;
a first baseline storage that stores, as a first base line, said first difference information extracted by said first difference information extracting part when a detection target is not in proximity to or does not contact said touch panel;
a detecting part that detects proximity to or contact with said touch panel by said detection target based on said first difference information extracted by said first difference information extracting part and said first baseline stored in said first baseline storage;
a second difference information extracting part that extracts, as second difference information, a difference in capacitance between a reference sensor being a predetermined sensor among said plurality of sensors and a sensor among said plurality of sensors and different from said reference sensor;
a second baseline storage that stores, as a second baseline, said second difference information extracted by said second difference information extracting part when said detection target is not in proximity to or does not contact said touch panel;
an abnormal state determining part that determines the presence of an abnormal state based on said second difference information extracted by said second difference information extracting part and said second baseline stored in said second baseline storage: and
a controller that, in response to said abnormal state determining part determining that there is an abnormal state, controls to update said first and second baselines stored in said first and second baseline storages respectively, wherein said controller determines if said touch panel device is in a normal operating state, if said controller determines that said touch panel device is in said normal operating state, said abnormal state determining part does not determine if there is an abnormal state, and said second difference information extracting part selects, as candidate sensors for said reference sensor, at least two or more sensors from said plurality of sensors, obtains a difference in capacitance between each of these candidate sensors and a sensor among said plurality of sensors and different from this candidate sensor, and based on the resultant differences, determines which of said candidate sensors is to become said reference sensor.

6. A touch panel device, comprising:
a touch panel having a plurality of sensors that measure a capacitance;
a first difference information extracting part that extracts, as first difference information, a difference in capacitance between adjacent ones of said plurality of sensors;
a first baseline storage that stores, as a first base line, said first difference information extracted by said first difference information extracting part when a detection target is not in proximity to or does not contact said touch panel;
a detecting part that detects proximity to or contact with said touch panel by said detection target based on said first difference information extracted by said first difference information extracting part and said first baseline stored in said first baseline storage;
a second difference information extracting part that extracts, as second difference information, a difference in capacitance between a reference sensor being a predetermined sensor among said plurality of sensors and a sensor among said plurality of sensors and different from said reference sensor;
a second baseline storage that stores, as a second baseline, said second difference information extracted by said second difference information extracting part when said detection target is not in proximity to or does not contact said touch panel;
an abnormal state determining part that determines the presence of an abnormal state based on said second difference information extracted by said second difference information extracting part and said second baseline stored in said second baseline storage; and
a controller that, in response to said abnormal state determining part determining that there is an abnormal state, controls to update said first and second baselines stored in said first and second baseline storages respectively, wherein
said second difference information extracting part selects, as candidate sensors for said reference sensor, at least two or more sensors from said plurality of sensors, obtains a difference in capacitance between each of these candidate sensors and a sensor among said plurality of sensors and different from this candidate sensor, and based on the resultant differences, determines which of said candidate sensors is to become said reference sensor.

7. The touch panel device according to claim 6, wherein said reference sensor used for extraction of said second difference information by said second difference information extracting part is different between a group of sensors among said plurality of sensors and arranged in a horizontal direction of said touch panel, and a group of sensors among said plurality of sensors and arranged in a vertical direction of said touch panel, and
said abnormal state determining part determines if there is an abnormal state about each of said groups of sensors.

8. The touch panel device according to claim 6, wherein said controller determines if said touch panel device is in a normal operating state, and
if said controller determines that said touch panel device is in said normal operating state, said abnormal state determining part does not determine if there is an abnormal state.

* * * * *